United States Patent
Lee et al.

(10) Patent No.: US 10,414,380 B2
(45) Date of Patent: Sep. 17, 2019

(54) WINDSHIELD WIPER BLADE

(71) Applicant: ALBEREE PRODUCTS, INC., Halethorpe, MD (US)

(72) Inventors: Albert Lee, Baltimore, MD (US); Choon Bae Lee, Incheon (KR)

(73) Assignee: ALBEREE PRODUCTS, INC., Halethorpe, MD (US)

( * ) Notice: Subject to any disclaimer, the term of this patent is extended or adjusted under 35 U.S.C. 154(b) by 320 days.

(21) Appl. No.: 15/247,747

(22) Filed: Aug. 25, 2016

(65) Prior Publication Data
US 2016/0362088 A1 Dec. 15, 2016

Related U.S. Application Data

(63) Continuation of application No. PCT/KR2015/001807, filed on Feb. 25, 2015.

(60) Provisional application No. 61/944,432, filed on Feb. 25, 2014.

(30) Foreign Application Priority Data

Jul. 1, 2014 (KR) .................. 10-2014-0082028

(51) Int. Cl.
*B60S 1/38* (2006.01)

(52) U.S. Cl.
CPC ............. *B60S 1/3881* (2013.01); *B60S 1/381* (2013.01); *B60S 1/387* (2013.01); *B60S 1/3887* (2013.01)

(58) Field of Classification Search
CPC .... B60S 1/3887; B60S 1/3891; B60S 1/3893; B60S 1/3881; B60S 1/381
See application file for complete search history.

(56) References Cited

U.S. PATENT DOCUMENTS

| | | |
|---|---|---|
| 2007/0022556 A1 | 2/2007 | Walworth et al. |
| 2010/0000041 A1* | 1/2010 | Boland ................ B60S 1/3868 15/250.32 |
| 2010/0186185 A1 | 7/2010 | Grasso et al. |

(Continued)

FOREIGN PATENT DOCUMENTS

| | | | |
|---|---|---|---|
| DE | 10000373 A1 * | 8/2001 | ............ B60S 1/3806 |
| DE | 101 20 467 A1 | 10/2002 | |

(Continued)

OTHER PUBLICATIONS

WO2011029660A1 (machine translation), 2011.*
DE10000373A1 (machine translation), 2001.*
JP2012136149A (machine translation), 2012.*

*Primary Examiner* — Andrew A Horton
(74) *Attorney, Agent, or Firm* — Birch, Stewart, Kolasch & Birch, LLP

(57) ABSTRACT

A windshield wiper blade is provided, which includes a long elastic member extended longitudinally, a wiping lever member, a spoiler supported longitudinally by the elastic member, and having a deflection portion, on the upper side of the elastic member, which bends due to the wind pressure received when a vehicle is traveling, and a base portion, on the lower side of the elastic member, for fixing the wiping lever member, and an outer plug coupled to the longitudinal end of the spoiler. A part of the outer plug is attached to the deflection portion by being inserted longitudinally thereinto, and another part of the outer plug is attached to the base portion by being hooked to the longitudinal side thereof.

20 Claims, 32 Drawing Sheets

(56) References Cited

U.S. PATENT DOCUMENTS

| | | | |
|---|---|---|---|
| 2010/0293737 A1* | 11/2010 | Ollier | B60S 1/3858 |
| | | | 15/250.34 |
| 2011/0107542 A1* | 5/2011 | Op't Roodt | B60S 1/3851 |
| | | | 15/250.31 |
| 2012/0066857 A1 | 3/2012 | Webert | |
| 2012/0233801 A1* | 9/2012 | Coart | B60S 1/3868 |
| | | | 15/250.32 |
| 2012/0284949 A1 | 11/2012 | Kraemer et al. | |
| 2012/0304413 A1 | 12/2012 | Boland | |

FOREIGN PATENT DOCUMENTS

| | | | | |
|---|---|---|---|---|
| DE | 103 35 393 A1 | | 9/2004 | |
| JP | 2010-527842 A | | 8/2010 | |
| JP | 2011-506203 A | | 3/2011 | |
| JP | 2012-136149 A | | 7/2012 | |
| JP | 2012136149 A | * | 7/2012 | |
| KR | 10-2008-0041631 A | | 5/2008 | |
| KR | 10-2012-0137472 A | | 12/2012 | |
| WO | WO 2011029660 A1 | * | 3/2011 | B60S 1/381 |

* cited by examiner

WINDSHIELD WIPER BLADE

CROSS-REFERENCE TO RELATED APPLICATIONS

This application is a continuation of International Application No. PCT/KR2015/001807, filed Feb. 25, 2015, which claims priority to U.S. Provisional Application No. 61/944,432, filed on Feb. 25, 2014, and to Korean Patent Application No. 10-2014-0082028, filed on Jul. 1, 2014, all of which are expressly incorporated herein by reference in their entireties.

TECHNICAL FIELD

The present invention relates to a windshield wiper blade, and, more particularly, to a windshield wiper blade, which is capable of preventing malfunctions by securely holding a spoiler, which has a hard base part and a flexible deflection part, at multiple points.

BACKGROUND ART

DE 101 20 467.1 discloses a related art wiper blade, which includes a deflection part and a base part formed on the lower end of the deflection part. The base part may be made of a harder material than the deflection part. A support member, which is made of a metal material, is coupled to the base part, and a squeegee, which serves as a blade, is connected to the support member. Alternatively, the squeegee may be integrally formed with the base part.

However, this related art wiper blade has a problem whereby it is difficult to securely mount the squeegee because the squeegee is connected to the support member. Furthermore, when the squeegee is integrally formed with the base part, there is a problem whereby the squeegee may be separated from the base part during the operation of the wiper blade because the base part and the squeegee are made of different materials.

DE 103 35 393 A1 discloses a related art wiper blade, which includes a spoiler, a support member, which is separated from the spoiler and is fitted into the lower part of the spoiler, and a retaining member, which has a groove and is formed on the lower surface of the spoiler so as to project downward. The squeegee is coupled to the spoiler by being fitted into grooves in the upper ends of the spoiler, the support member and the retaining member.

However, this related art wiper blade has a problem whereby it is impossible to securely hold a squeegee because the retaining member is made of the same flexible material as the deflection strip of the spoiler.

SUMMARY OF THE INVENTION

In order to solve the above technical problems, an object of the present is to provide a windshield wiper blade, which is capable of preventing malfunction by securely holding the spoiler and is also capable of improving the poor heterogeneous appearance of a spoiler having a hard base part and a flexible deflection part.

According to one embodiment of the present invention, a windshield wiper blade is provided that includes an elastic member extending longitudinally, a wiping rubber member, a spoiler extending longitudinally and being supported by the elastic member, the spoiler including a deflection part disposed on the elastic member and a base part disposed under the elastic member so as to hold the wiping rubber member, the deflection part being bent due to wind pressure applied while a vehicle is being driven, and outer plugs coupled to opposite ends of the spoiler, the outer plugs being partially fitted into the deflection part longitudinally and being partially engaged with the base part longitudinally.

The outer plugs may be coupled to the opposite ends of the spoiler such that outer surfaces of the outer plugs match an outer surface of the deflection part.

The deflection part may be configured to have a triangular cross-section, and the outer plugs may be configured to have a cross-section corresponding to the triangular cross-section of the deflection part.

Opposite ends of the deflection part, to which the outer plugs are coupled, may have a first holding hole, the first holding hole being longitudinally formed in a center of the triangular cross-section of the deflection part, and wherein the deflection part may have a second holding hole, the second holding hole being longitudinally formed in an upper apex of the triangular cross-section of the deflection part.

Each of the outer plugs may include a first projecting pin to be fitted into the first holding hole, and a second projecting pin to be fitted into the second holding hole, the first and second projecting pins projecting toward the deflection part.

The first projecting pin may include a fitting protrusion formed on an outer surface thereof such that the first projecting pin is forcibly fitted into the first holding hole.

Each of the outer plugs may further include a pair of guide pieces, which project toward the deflection part so as to come into surface contact with an outer surface of the deflection part under the second holding hole.

Each of the outer plugs may have therein a base part-receiving space, into which opposite ends of the base part of the spoiler are partially fitted, and the base part-receiving space may include at a center area thereof a first stopper step, which engages an intermediate portion of each of the opposite ends of the spoiler with each of the outer plugs, and wherein the base part-receiving space may include a second stopper step, which engages each of the outer plugs with each of the opposite ends of the spoiler.

The windshield wiper blade may further include an elastic member, which is fitted into an elastic member through hole longitudinally formed through the spoiler along a boundary between the base part and the deflection part, wherein the first stopper step may be engaged with the elastic member, and the second stopper step may be engaged with the base part.

The spoiler may have in an intermediate area thereof a recess, which is formed by cutting away the deflection part, the recess being coupled to an adapter assembly for coupling to a driving arm mounted on a vehicle.

The adapter assembly may include an adapter coupled to the driving arm, an adapter holder secured to the spoiler so as to enable the adapter to be coupled to the spoiler, an adapter holder bracket including interference fitting portions, which are formed in a center region thereof and are moved downward from above so as to be forcibly fitted in the recess, and first and second hook rings having engagement areas, to which opposite ends of the adapter holder are respectively hooked by being moved downward from above.

The windshield wiper blade may further include an elastic member, which is fitted into an elastic member through hole longitudinally formed through the spoiler along a boundary between the base part and the deflection part, wherein the interference fitting portions may project downward toward the recess from lateral side edges of the adapter holder bracket so as to be engaged with lateral side edges of the elastic member.

The base part of the spoiler may have mounting cuts, which are formed in regions thereof corresponding to the interference fitting portions so as to avoid interference with the interference fitting portions coupled to the elastic member.

The windshield wiper blade may further include inner plugs, which are coupled to opposite ends of the recess before the adapter assembly is coupled to the recess.

The inner plugs may be coupled to a center region of the recess by being moved downward from above, and may be then slidably moved to and coupled to the opposite ends of the recess while surrounding lateral side edges of the base part.

Each of the inner plugs may have a cross-section such that an outer surface thereof matches an outer surface of the deflection part.

The deflection part may be configured to have a triangular cross-section, and wherein each of the inner plugs may include a first projecting pin fitted into the first holding hole, which is longitudinally formed in the center of the triangular cross-section of a portion of the deflection part corresponding to each of the opposite ends of the recess, and a second projecting pin fitted into the second holding hole, which is longitudinally formed in an upper apex of the triangular cross-section of a portion of the deflection part corresponding to each of the opposite ends of the recess.

The adapter holder may be coupled to the adapter holder bracket so as to cover the adapter holder bracket, and the adapter holder may include therein first and second hook protrusions, which are respectively hooked to the first and second hook rings.

The adapter holder may further include a release lever, which is connected to at least one of the first and second hook protrusions and projects outward.

The adapter holder may be engaged with both the first and second hook rings by being pressed downward from above, in order to be coupled to the adapter holder bracket, and wherein the adapter holder may be removed by being rotated after one of hook couplings between the first and second hook rings and the first and second hook protrusions is released by the release lever, in order to be removed from the adapter holder bracket.

The base part may be made of a flexible material, and the deflection part may be made of a hard material.

The spoiler may be divided into first and second spoiler segments with respect to an intermediate area thereof, at which the recess is provided.

The windshield wiper blade according to the present invention offers various effects as follows.

First, since opposite ends of the spoiler, which is constituted by the flexible deflection part and the hard base part, are securely held by means of the outer plugs, the present invention offers an effect of having an improved the appearance.

Second, since the intermediate region of the spoiler, which is provided with the recess, is securely held by means of the inner plugs, the present invention offers an effect of facilitating assembly of the adapter assembly, which is capable of accommodating various types of driving arms.

BRIEF DESCRIPTION OF DRAWINGS

FIG. 19 includes a perspective view and an exploded perspective view, which illustrate the second adapter 900 illustrated in FIG. 18a;

DETAILED DESCRIPTION OF THE INVENTION

Hereinafter, an embodiment of a windshield wiper blade 100 according to the present invention will be described in detail with reference to the accompanying drawings.

Figure 1:
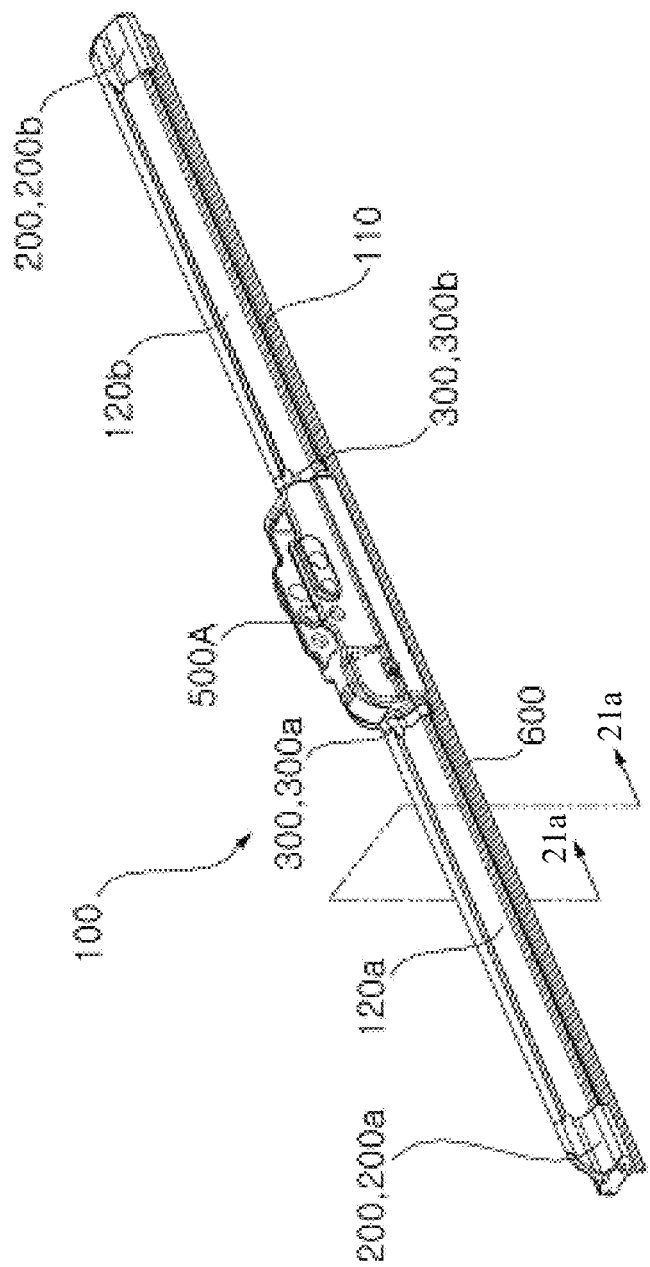
FIG. 1 is a perspective view illustrating the appearance of an embodiment of a windshield wiper blade according to the present invention.
Figure 2:
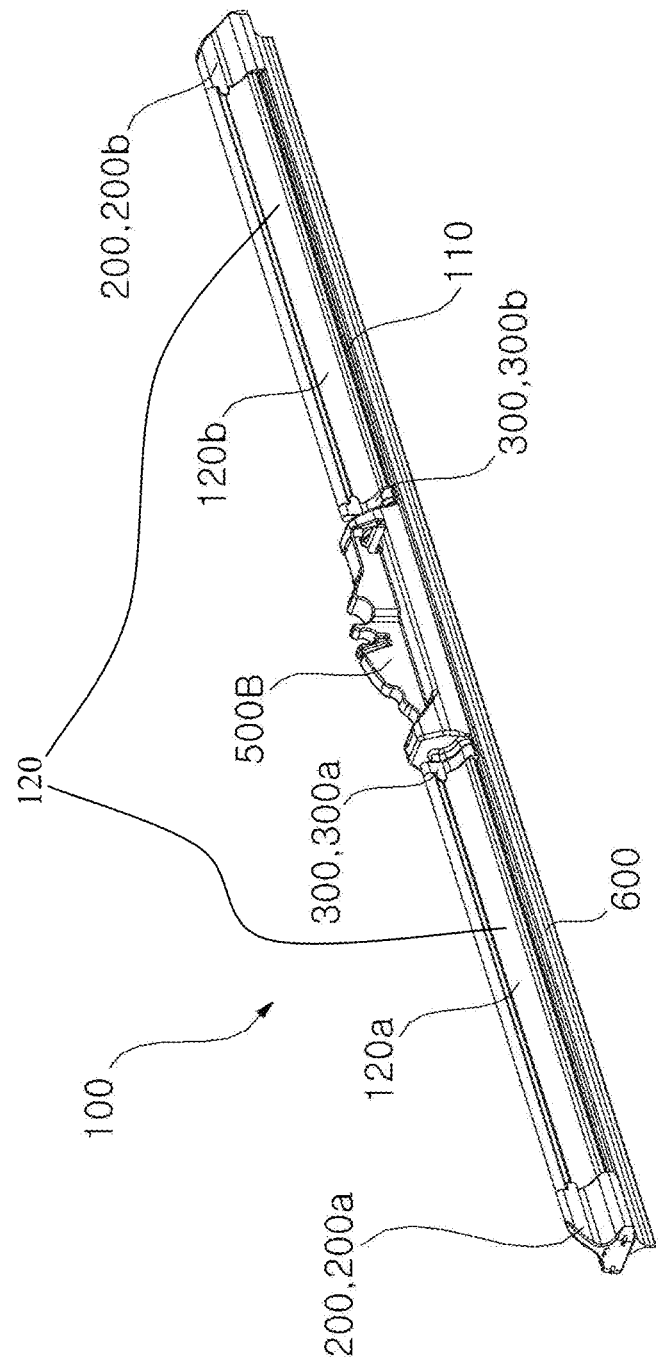
FIG. 2 is a perspective view illustrating the appearance of the windshield wiper blade shown in FIG. 1, to which a modified adapter holder, which is one of the components of the windshield wiper blade, is coupled.
Figure 3:
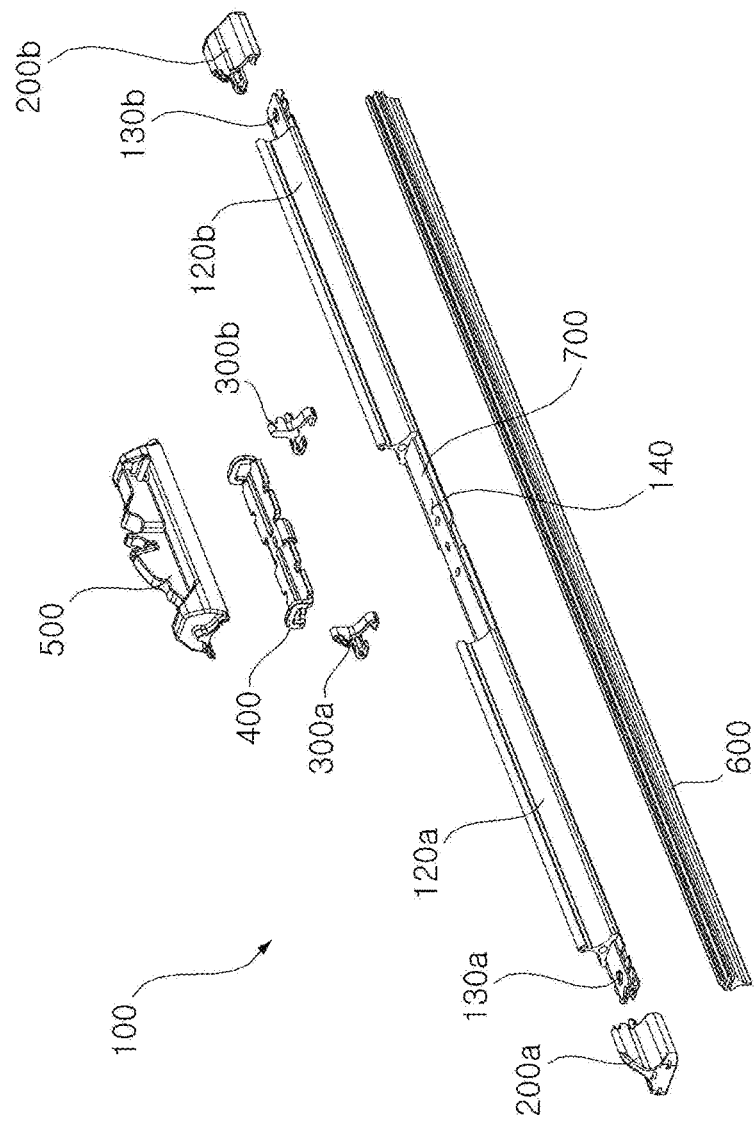
FIG. 3 is an exploded perspective view of FIG. 2.

FIG. 1 is a perspective view illustrating the appearance of the embodiment of the windshield wiper blade 100 according to the present invention. FIG. 2 is a perspective view illustrating the appearance of the windshield wiper blade shown in FIG. 1, to which a modified adapter holder, which is one of the components of the windshield wiper blade, is coupled. FIG. 3 is an exploded perspective view of FIG. 2.

The embodiment of the windshield wiper blade 100 according to the present invention includes a spoiler 110, 120, which is rotatably moved by a driving arm (not shown) mounted on a vehicle.

As illustrated in FIGS. 1 to 3, the spoiler 110, 120 includes a base part 110, which extends longitudinally so as to constitute the framework, and a deflection part 120, which projects from the upper surface of the base part 110 so as to have a predetermined cross-section and extends longitudinally.

The spoiler 110, 120 may be supported by an elastic member 700, which is disposed between the base part 110 and the deflection part 120 and extends therebetween. In other words, it will be appreciated that the spoiler 110, 120 is constructed such that the deflection part 120 is disposed on the elastic member 700 and the base part 110 is disposed thereunder.

The embodiment of the windshield wiper blade 100 according to the present invention may further include a wiping rubber member 600, which is coupled to the lower part of the spoiler 110, 120, namely, the base part 110.

The wiping rubber member 600 is substantially coupled to the spoiler 110, 120, and is rotated while being in contact with a surface of a windshield so as to serve to wipe off contaminants and/or rain water.

Furthermore, the embodiment of the windshield wiper blade according to the present invention may further include outer plugs 200, which are coupled to opposite ends of the spoiler 110, 120 in such a manner that each of the outer plugs is longitudinally fitted with the deflection part 120 and is engaged with longitudinal edges of the base part 110.

The spoiler 110, 120 is coupled to the driving arm, which is rotatably mounted on a vehicle. Specifically, the spoiler 110, 120 is coupled to the driving arm via an adapter assembly, which will be described later. As described above, the spoiler 110, 120 is provided with the wiping rubber member 600, which wipes contaminants and/or rain water while being in substantial contact with the front surface of the windshield.

Figure 4A:
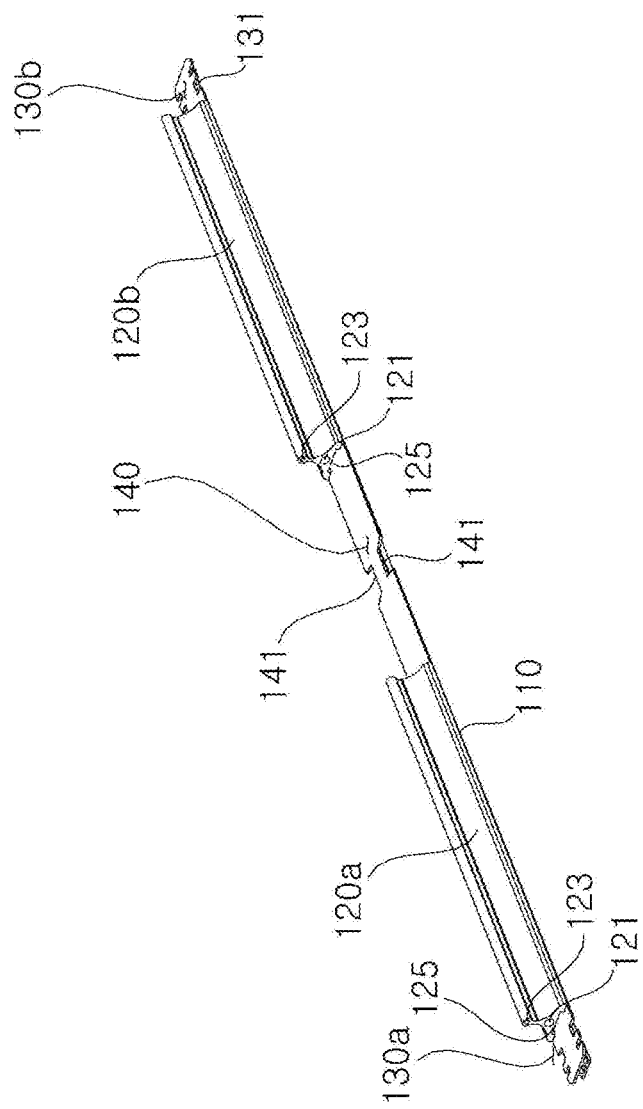
FIGS. 4a and 4b are a perspective view and a plan view, respectively, which illustrate a spoiler, which is one of the components illustrated in FIG. 1.
Figure 4B:
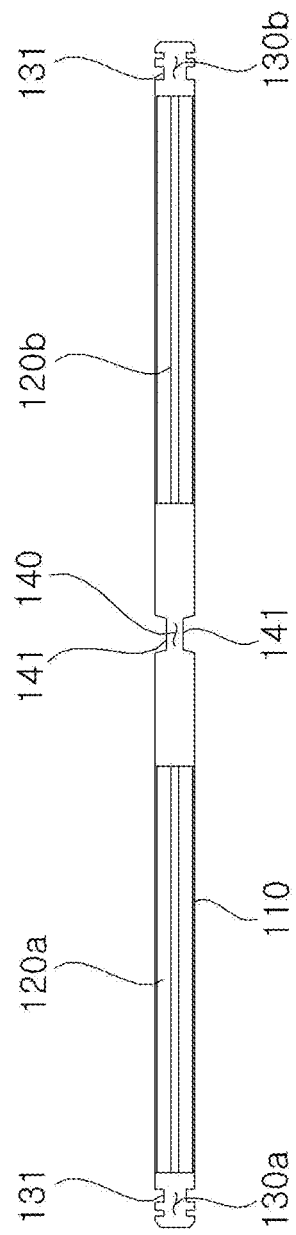

FIGS. 4a and 4b are a perspective view and a plan view illustrating the spoiler 110, 120 among the components of FIG. 1.

As illustrated in FIGS. 4a and 4b, the spoiler 110, 120 may include the base part 110, which is constituted by a plate body having upper and lower surfaces with a predetermined thickness defined therebetween and which extends longitudinally so as to constitute the overall framework of the wiper blade, and the deflection part 120 integrally formed on the upper surface of the base part 110.

In this specification, terms such as "upper surface" and "lower surface" are provided only for convenience of understanding of the windshield wiper blade 100 according to the present invention, and the scope of right of the present invention should not be restricted thereto. Accordingly, the base part 110 may be configured to have any form as long as it is constituted by a plate body, which is elongated longitudinally and has a predetermined thickness defined between both side surfaces.

Although the base part 110 and the deflection part 120 are integrally formed with each other, the base part 110 serves as the framework to which a plurality of components, which will be described later, is coupled. Accordingly, the base part 110 may be made of a more rigid material than the deflection part 120, whereas the deflection part 120 may be made of a more flexible material than the base part 110 such that the deflection part 120 flexes under wind pressure, which is substantially applied to the deflection part 120 during movement of the vehicle.

More specifically, the deflection part 120 is made of a flexible material, which is able to be deformed by external force applied thereto, and the base part 110 is made of a material, which has rigidity sufficient to maintain a certain form against external force. The deflection part 120 and the base part 110 constitute a single component. As a process of manufacturing a single component from different materials, injection molding, welding, bonding, fitting, coextrusion and the like are well known in the art. However, the process is not limited thereto, and other appropriate processes may be applied.

As illustrated in FIGS. 4a and 4b, the spoiler 110, 120 may be provided with a recess 140, which is formed by cutting away a middle portion of the deflection part 120 such that the base part 110 is exposed upward through the cut portion of the deflection part 120. The recess 140 may be provided with an adapter assembly coupled thereto such that the spoiler 110, 120 is coupled to the driving arm mounted on a vehicle.

The construction of the adapter assembly coupled to the recess 140 and the more specific construction of the spoiler 110, 120 will be described in detail later.

The wiping rubber member 600 comes into close contact at the lower end thereof with a surface of a windshield. The wiping rubber member 600 serves to wipe out contaminants and/or rain water while being rotated along the surface of the windshield during the operation of the windshield wiper blade 100. The wiping rubber member 600 may be made of a flexible material such as rubber or synthetic resin, which is capable of being deformed by external force.

Figure 5A:
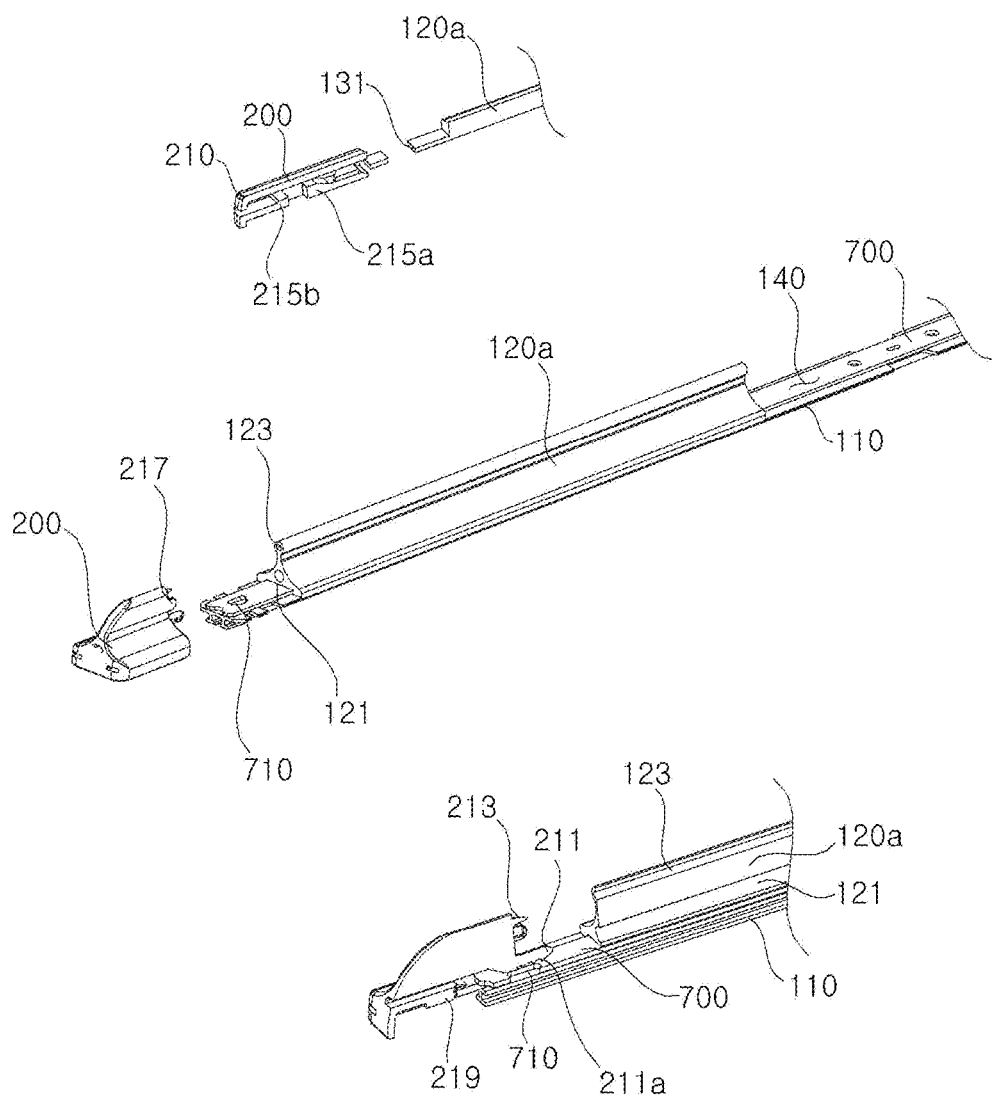
FIG. 5a includes an exploded perspective view and a partially broken-away perspective view, which illustrate the state in which an outer plug is not yet coupled to the spoiler, which are components illustrated in FIG. 1.
Figure 5B:
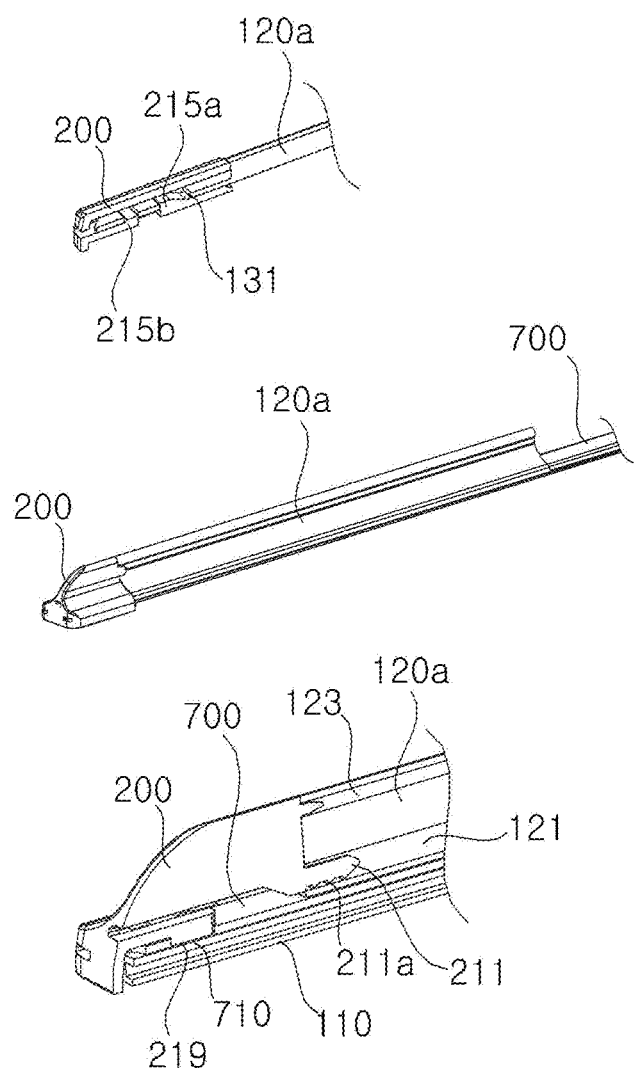
FIG. 5b includes a fragmentary perspective view and a partially broken-away perspective view, which illustrate the state in which the outer plug is coupled to the spoiler, which are components illustrated in FIG. 1.

FIG. 5a includes an exploded perspective view and a partially broken-away perspective view, which illustrate the state in which the outer plug 200 is not yet coupled to the spoiler 110, 120, which are components illustrated in FIG. 1. FIG. 5b includes a fragmentary perspective view and a partially broken-away perspective view, which illustrate the state in which the outer plug 200 is coupled to the spoiler 110, 120, which are components illustrated in FIG. 1.

The deflection part 120 may be configured to have a triangular cross-section. However, the deflection part 120 does not need to have a perfectly triangular cross-section, and may be configured to have a triangular cross-section having a predetermined curvature as long as two apexes of the triangle are positioned near the base part 110 and the remaining apex of the triangle is positioned above the base part 110.

In the embodiment of the present invention, the deflection part 120 may be configured to have quadratic curves in which the rate of decrease of a horizontal distance between two inclined side surfaces converging on the upper apex is decreased moving upward.

In the windshield wiper blade 100 according to the embodiment of the present invention, the spoiler 110, 120, which is supported by the elastic member 700, may be constituted by a single structure, which is longer than the longitudinal length of the elastic member 700, or may be constituted by two or more structural segments, which are capable of being separated from each other in opposite directions with respect to the middle portion having the recess 140 and which are securely supported by the elastic member 700. Accordingly, the scope of rights of the present invention should not be interpreted as being limited to the spoiler 110, 120, which is constituted by a single structure.

Opposite ends of the spoiler 110, 120, which correspond to opposite ends of the windshield wiper blade 100 according to the present invention in a longitudinal direction, are provided with coupling spaces 130a and 130b so as to enable the outer plugs 200 to be coupled to the opposite ends from the outside.

Like the recess 140, which is formed by cutting away the deflection part 120 so as to expose the base part 110 through the cutting portion of the deflection part 120, the coupling spaces 130a and 130b may be formed by cutting away the opposite ends of the deflection part 120 so as to expose the base part 110 through the cutting portions of the deflection part 120.

The outer plug 200 may be configured to have a shape corresponding to the cross-sectional shape of the deflection part 120. However, the shape of the outer plug 200 does not need to exactly coincide with the cross-sectional shape of the deflection part 120, and the outer plug 200 may be configured to approximately coincide with a portion of the outer surface of the deflection part 120.

In the case in which the spoiler 110, 120 is constituted by a single structure, the outer plugs 200 include a first outer plug 200a and a second outer plug 200b, which are respectively coupled to the opposite ends of the spoiler 110, 120. The outer plugs 200 serve to prevent longitudinal displacement of the wiping rubber member 600 and the elastic member 700, which are coupled to the spoiler 110, 120. Specifically, since the wiping rubber member 600 and the elastic member 700 are slidably coupled to the spoiler 110, 120, the outer plugs 200 coupled to the opposite ends of the spoiler 110, 120 serve to prevent movement of the wiping rubber member 600 and the elastic member 700 in the sliding direction. The specific structure by which the wiping rubber member 600 and the elastic member 700 are coupled to the spoiler 110, 120 will be described later.

The opposite ends of the deflection part 120, to which the outer plugs 200 are coupled, may be provided with a first holding hole 121, which is longitudinally formed in the center of the triangular cross-section of the deflection part 120, and the deflection part 120 may be provided with a second holding hole 123, which is longitudinally formed in the upper apex of the triangular cross-section of the deflection part 120.

The first holding hole 121 and the second holding hole 123 may be formed through the entire length of the deflection part 120. Although the first holding hole 121 and the second holding hole 123 are the same in structure as a first through hole P1 and a second through hole P2, which will be described later, the first holding hole 121 and the second holding hole 123 are different from the first and second through holes P1 and P2 in function. Accordingly, in order to prevent confusion in distinguishing the terms, portions of the holes that are exposed to the outside will be referred to as the first holding hole 121 and the second holding hole 123, and portions of the holes that are not exposed to the outside, will be referred to as the first through hole P1 and the second through hole P2.

The outer plug 200 may be provided with a first projecting pin 211, which is to be fitted into the first holding hole 121, and a second projecting pin 213, which is to be fitted into the second holding hole 123. The first and second projecting pins 211 and 213 extend toward the deflection part 120.

The first projecting pin 211 and the second projecting pin 213 are longitudinally fitted into the first holding hole 121 and the second holding hole 123, respectively, while the outer plugs 200 are moved toward the spoiler 110, 120 from outside the opposite ends of the spoiler 110, 120. Consequently, the first and second projecting pins 211 and 213 serve to substantially hold the flexible deflection part 120.

More specifically, the first projecting pin 211 may be provided on the outer surface thereof with fitting protrusions 211a so as to cause the first projecting pin 211 to be fitted into the first holding hole 121 in an interference fit manner. Since the fitting protrusions 211a are securely maintained in the first holding hole 121 in the state of being in close contact with the inner surface of the first holding hole 121, the fitting protrusions 211a serve to maintain a predetermined coupling force with the deflection part 120 even when the deflection part 120 is shaken by wind pressure while the vehicle is being driven.

Since the second projecting pin 213 is fitted into the second holding hole 123, which is formed in the upper ridge of the deflection part 120, which is relatively sharpened upward, the second projecting pin 213 serves to prevent deterioration in the appearance of the windshield wiper blade attributable to the formation of a gap between the matching surfaces of the deflection part 120 and the outer plug 200 when the deflection part 120 is shaken by wind pressure while the vehicle is being driven.

The outer plug 200 may further be provided with a pair of guide pieces 217, which project toward the deflection part 120 so as to come into surface contact with the outer surface of the deflection part 120 under the second holding hole 123.

The upper ridge portion of the deflection part 120, in which the second holding holder 123 is formed, is configured to have a circular cross-section having a diameter greater than the thickness of the portion under the upper ridge such that the second holding hole 123, having a predetermined diameter, is formed in the upper ridge portion of the deflection part 120. The pair of guide pieces 217 serves to support the deflection part 120 while being in contact with the outer surface of the deflection part 120 under the second holding hole 123. In other words, the pair of guide pieces 217 serve to support, in conjunction with the second projecting pin 213 fitted into the second holding hole 123, the outer surface of the deflection part 120, which is shaken by wind pressure while the vehicle is being driven, thereby fundamentally preventing generation of a gap between the matching surfaces of the deflection part 120 and the outer plug 200.

The outer plug 200 may be provided therein with a receiving space for the base part 110, into which a portion of the end of the base part 110 of the spoiler 110, 120, which defines the coupling space 130a or 130b, is fitted. The outer plug 200 is horizontally moved toward the spoiler 110, 120 from outside the end of the spoiler 110, 120 such that the end of the base part 110 is fitted into the receiving space for the base part 110 and is coupled thereto.

As illustrated in FIGS. 5a and 5b, the end of the base part 110, which corresponds to the coupling space 130a or 130b, may be provided in two lateral sides thereof with first stopper holes 131, which are open in the lateral direction. The region of the outer plug 200 that corresponds to the receiving space for the base part 110, may be provided with first stopper steps 215a and 215b, which are engaged with the first stopper holes 131.

Specifically, since the first projecting pin 211 and the second projecting pin 213 of the outer plug 200 are fitted into the first holding hole 121 and the second holding hole 123 in the longitudinal direction of the spoiler 110, 120, as described above, while the first stopper steps 215a and 215b are engaged with the first stopper holes 131, the outer plug 200 is maintained in place in the longitudinal direction of the spoiler 110, 120.

As illustrated in FIGS. 5a and 5b, the elastic member 700 is fitted into an elastic member through hole 125, which extends longitudinally so as to divide the spoiler 110, 120 into the base part 110 and the deflection part 120, thereby elastically supporting the spoiler 110, 120.

Here, the elastic member 700 may, of course, be mounted so as to be exposed or so as not to be exposed through the coupling space 130a or 130b, in which the outer plug 200 is coupled.

In the windshield wiper blade 100 according to the embodiment of the present invention, the elastic member 700 will be described based on the case in which the end of the elastic member 700 is exposed through the coupling space 130a or 130b, in which the outer plug 200 is coupled.

The end of the elastic member 700 may be provided in the center thereof with a second stopper hole 710, which is vertically formed through the elastic member 700. The second stopper hole 710 may be engaged with a second stopper step 219, which is formed in the receiving space for the base part 110 of the outer plug 200 at a location corresponding to the second stopper hole 710.

In the windshield wiper blade 100 according to the embodiment of the present invention, the second stopper hole 710 and the second stopper step 219 may be eliminated. In the case in which the end of the elastic member 700 is exposed through the coupling space 130a or 130b, as described above, the second stopper hole 710 and the second stopper step 219 may be selectively provided for secure coupling of the outer plug 200.

When the outer plug 200 is coupled in the coupling space 130a or 130b, which corresponds to the end of the spoiler 110, 120, the outer surface of the deflection part 120 becomes flush with the outer surface of the outer plug 200, thereby exhibiting an aesthetically pleasing integral appearance.

More specifically, the deflection part 120 is configured so as to have a triangular vertical cross-section having three apexes, wherein the outer surface of the deflection part 120 adjacent to the upper apex exhibits a quadratic surface. The outer plug 200 is also configured so as to have a triangular vertical cross-section. When the outer plug 200 is coupled in the coupling space 130a or 130b, the outer surface of the outer plug 200 is smoothly connected to the outer surface of the deflection part 120, excluding a portion corresponding to the coupling space 130a or 130b, without a stepped portion therebetween. Accordingly, since the outer surface of the outer plug 200 is smoothly connected to the outer surface of the deflection part 120 so as to be flush therewith, it is possible to offer an effect of exhibiting an integral appearance to a user.

In the embodiment of the windshield wiper blade 100 according to the present invention, only one of the first outer plug 200a and the second outer plug 200b, that is, only the first outer plug 200a, is mounted on the spoiler 110, 120 before the wiping rubber member 600, which will be described later, is coupled to the base part 110 of the spoiler 110, 120, and the other outer plug 200b is left uncoupled for mounting of the wiping rubber member 600 and is mounted in a coupling manner, which will be described later.

Figure 6A:
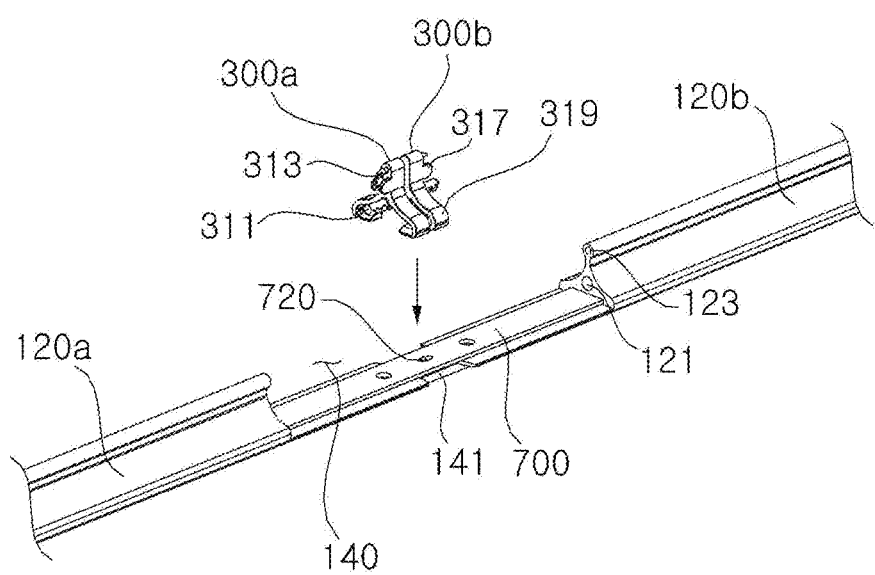
FIGS. 6a to 6c include an exploded perspective view and partially broken-away perspective views, which illustrate the mounted state of inner plugs, which are components illustrated in FIG. 1.
Figure 6B:
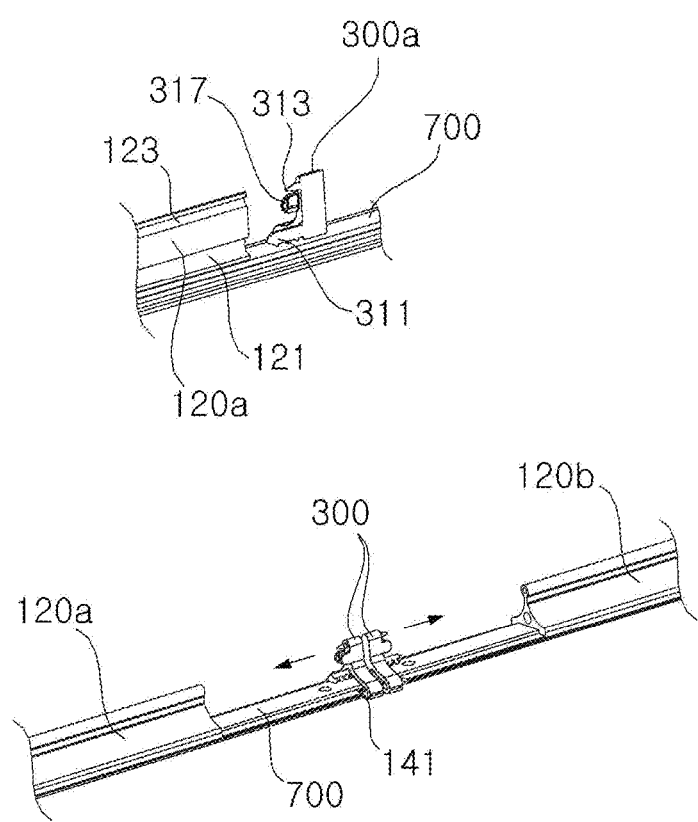
Figure 6C:
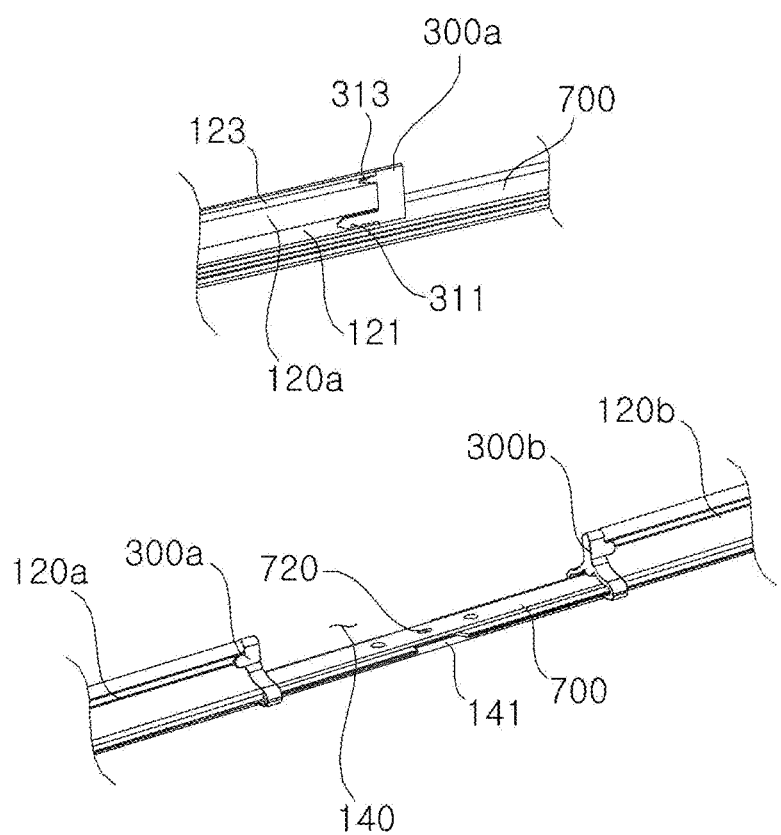

FIGS. 6a to 6c are an exploded perspective view and a partially broken-away fragmentary perspective view, which illustrate a mounting procedure of inner plugs 300 among the components shown in FIG. 1.

As illustrated in FIGS. 6a and 6b, in the embodiment of the windshield wiper blade 100 according to the present invention, the adapter assembly, which serves to enable the windshield wiper blade to be coupled to a driving arm mounted on a vehicle, may be coupled in the recess 140, which is formed by cutting away only the deflection part 120 while leaving the base part 110.

Here, the recess 140 refers to the area that is required to couple the adapter assembly to the windshield wiper blade 100.

The flexible deflection part segments 120 are disposed at the opposite ends of the recess 140, and the rigid base part 110 serves as a coupling portion between the two deflection part segments 120. Accordingly, there is a necessity to provide a holding structure similar to the outer plug 200, which is mounted on the opposite ends of the spoiler 110, 120 so as to securely hold the spoiler 110, 120.

In the embodiment of the windshield wiper blade 100 according to the present invention, before the adapter assembly is coupled into the recess 140, the inner plugs 300 are coupled to the ends of the deflection part segments 120a and 120b, which define the opposite ends of the recess 130, in a manner similar to the coupling manner of the outer plugs 200.

The ends of the deflection part segments 120a and 120b, which correspond to the opposite ends of the recess 140, may be provided therein with the first holding hole 121 and the second holding hole 123 at the same positions. As described above, since the first holding hole 121 and the second holding hole 123 may be considered to be the same as the first through hole P1 and the second through hole P2, which are formed through the entire length of the spoiler 110, 120, the first through hole P1 and the second through hole P2 will be denoted by the same reference numbers as those of the first holding hole 121 and the second holding hole 123 for convenience of explanation.

As illustrated in FIGS. 6a and 6b, each of the inner plugs 300 may include a first projecting pin 311 to be fitted into the first holding hole 121, a second projecting pin 313 to be fitted into the second holding hole 123, a pair of guide pieces 317 to be engaged with the outer surface of the deflection part 120, and a pair of grip legs 319, which are bent so as to surround the two lateral edges of the base part 110.

Since the shapes and functions of the first projecting pin 311, the second projecting pin 313 and the guide pieces 317 of the inner plug 300 are the same as those of the first projecting pin 211, the second projecting pin 213, and the guide pieces 217 of the outer plug 200, a description regarding the coupling procedure with respect to the deflection part 120 is omitted.

The base part 110 may be provided at regions corresponding to the middle region of the recess 140 with mounting cutouts 141, which are formed in lateral edges of the base part 110 so as to be open in lateral and outward directions, such that the pair of grip legs 319, each having a small width, pass through the mounting cutouts 141 and surround the lateral edges of the base part 110 by longitudinal movement.

The inner plugs 300 are moved downward from above the middle area of the recess 140, and are inserted into the base part 110 through the mounting cutouts 141. The inner plugs 300 are slidably moved toward the opposite ends of the recess 140 in the longitudinal direction of the spoiler 110, 120 while surrounding the lateral edges of the base part 110, and the first projecting pins 211 and the second projecting pins 213 thereof are respectively fitted into the first holding holes 121 and the second holding holes 123.

As described above, the inner plugs 300 are coupled to the opposite ends of the recess 140 so as to serve to securely hold the flexible deflection part 120 and to distinctly distinguish the deflection part 120 of the spoiler 110, 120 from the recess 140, in which the adapter assembly is coupled.

After the inner plugs 300 are coupled to the opposite ends of the recess 140, the adapter assembly for enabling the windshield wiper blade to be coupled to a driving arm of a vehicle is mounted in the recess 140.

Figure 7:
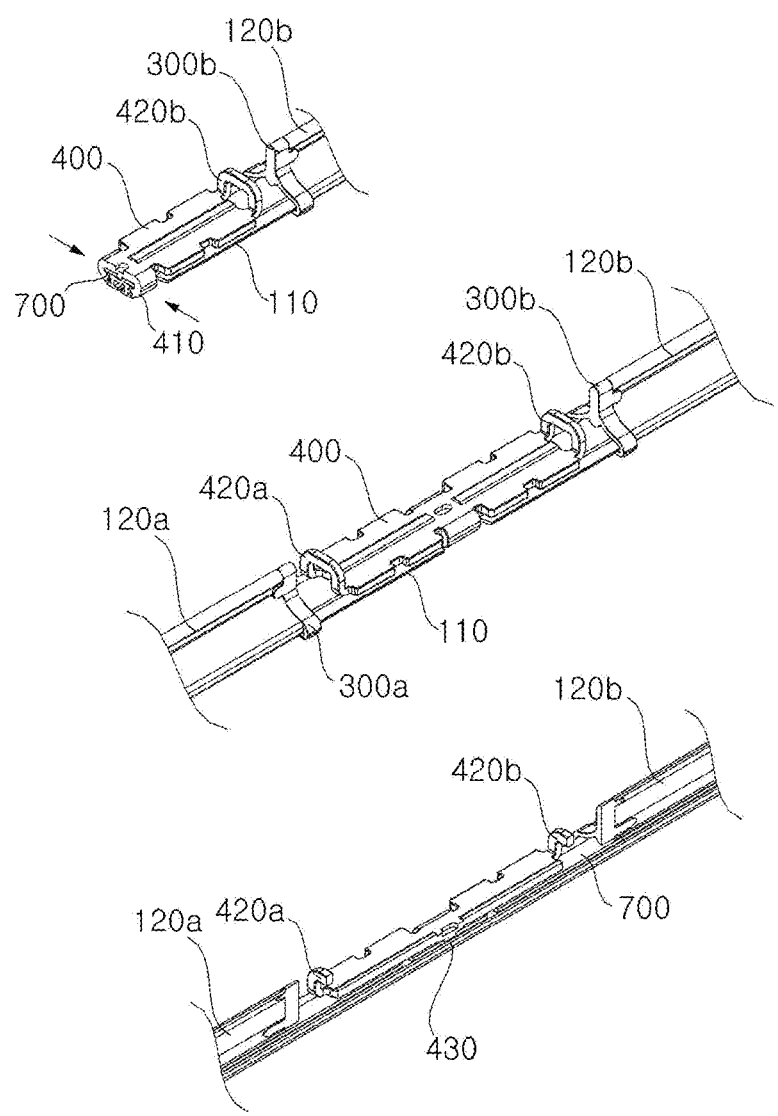
FIG. 7 includes a perspective view and a partially broken-away perspective view, which illustrate the state in which an adapter holder bracket, which is one of the components illustrated in FIG. 1, is coupled.
Figure 8:
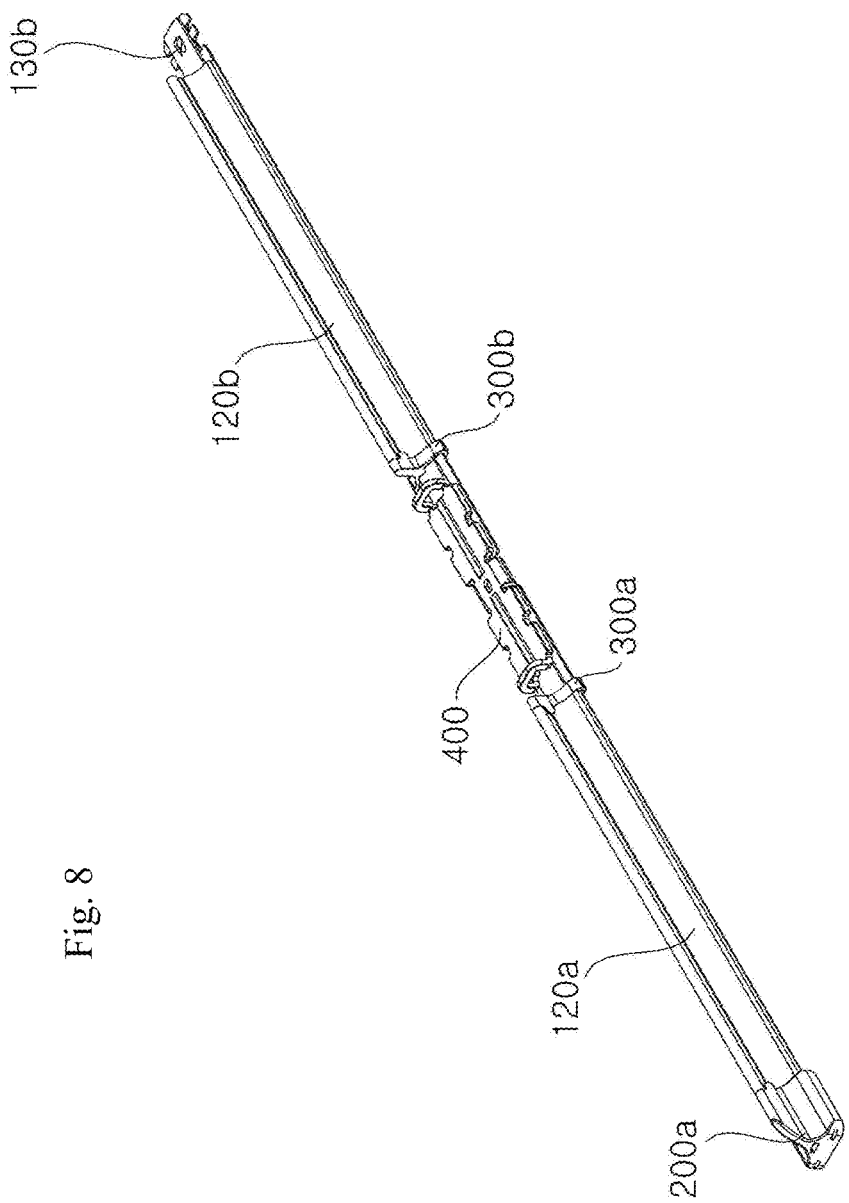
FIG. 8 is a perspective view illustrating the state in which the adapter holder bracket, which is one of the components illustrated in FIG. 1, is coupled.

FIG. 7 includes a perspective view and a partially broken-away perspective view, which illustrate the state in which an adapter holder bracket 400, which is one of the components illustrated in FIG. 1, is coupled. FIG. 8 is a perspective view illustrating the state in which the adapter holder bracket 400, which is one of the components illustrated in FIG. 1, is coupled.

The adapter assembly includes an adapter 800, 900 or 1000, which is coupled to a driving arm (see FIGS. 11 to 20), an adapter holder 500A or 500B, which is secured to the spoiler 110, 120 so as to enable the adapter 800, 900 or 1000 to be coupled to the spoiler 110, 120 (see FIGS. 11 to 20), and the adapter holder bracket 400, which is coupled in the recess 140 so as to provide an area to which the adapter holder 500A or 500B is coupled.

As illustrated in FIGS. 7 and 8, the adapter holder bracket 400 may include interference fitting portions 410, which are formed at the center region thereof and which are moved downward from above so as to be forcibly fitted into the recess 140, and a first hook ring 420a and a second hook ring 420b, to which opposite ends of the adapter holder 500A or 500B, which are moved downward from above, are hooked.

The interference fitting portions 410 are forcibly fitted into the mounting cutouts 141 in the base part 110, through which the pair of grip legs 319 of the inner plugs 300 are inserted. The interference fitting portions 410 are securely engaged with the lateral edges of the elastic member 700, which divides the spoiler 110, 120 into the base part 110 and the deflection part 120.

The first hook ring 420a and the second hook ring 420b may project upward from the opposite ends of the adapter holder bracket 400 so as to define ring shapes. The first hook ring 420a and the second hook ring 420b, which are bent into ring shapes, are coupled to the adapter holder in such a manner that hook protrusions 510a and 510b, provided in the adapter holder 500A or 500B, which will be described later, are hooked to the first hook ring 420a and the second hook ring 420b by being moved outward from inside the first and second hook rings 420a and 420b.

Figure 9:
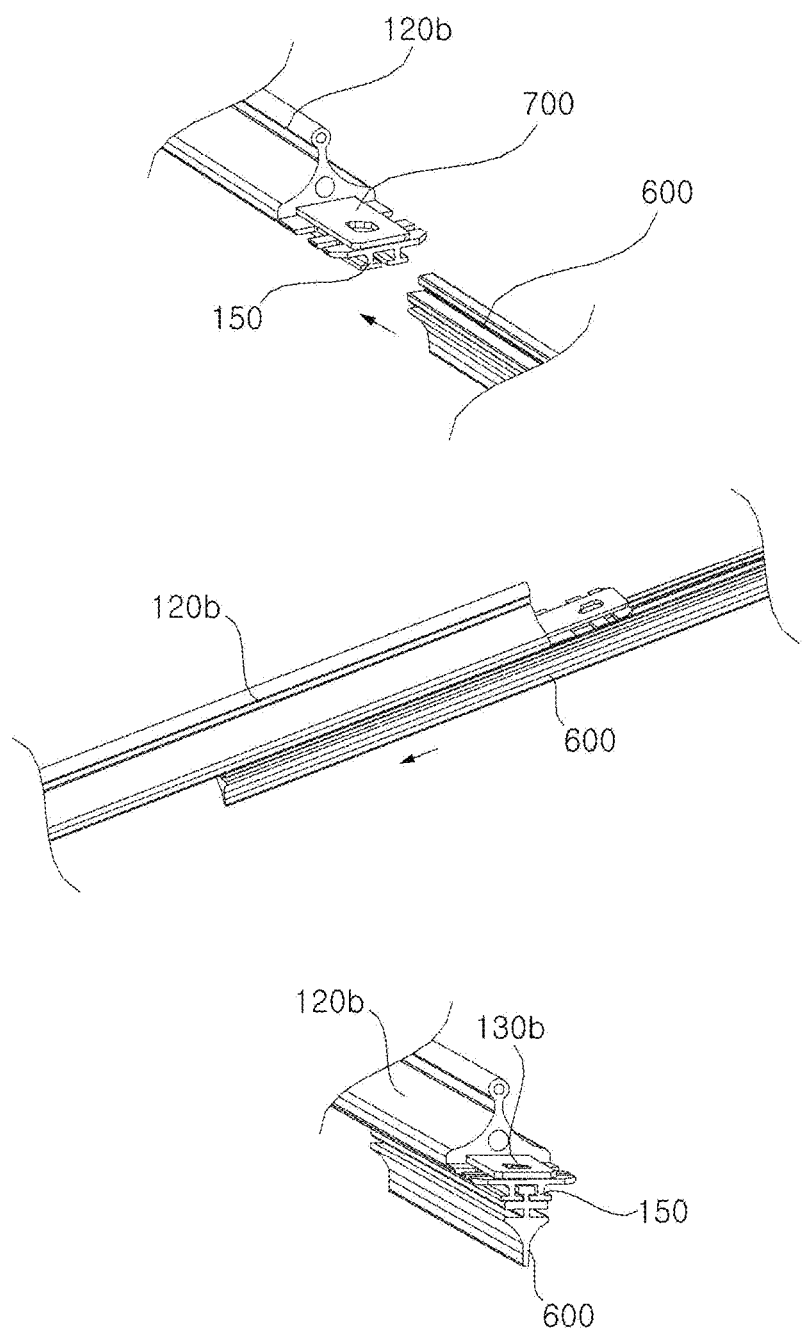
FIG. 9 is a perspective view illustrating a procedure of coupling a wiping rubber member, which is one of the components illustrated in FIG. 1.
Figure 10:
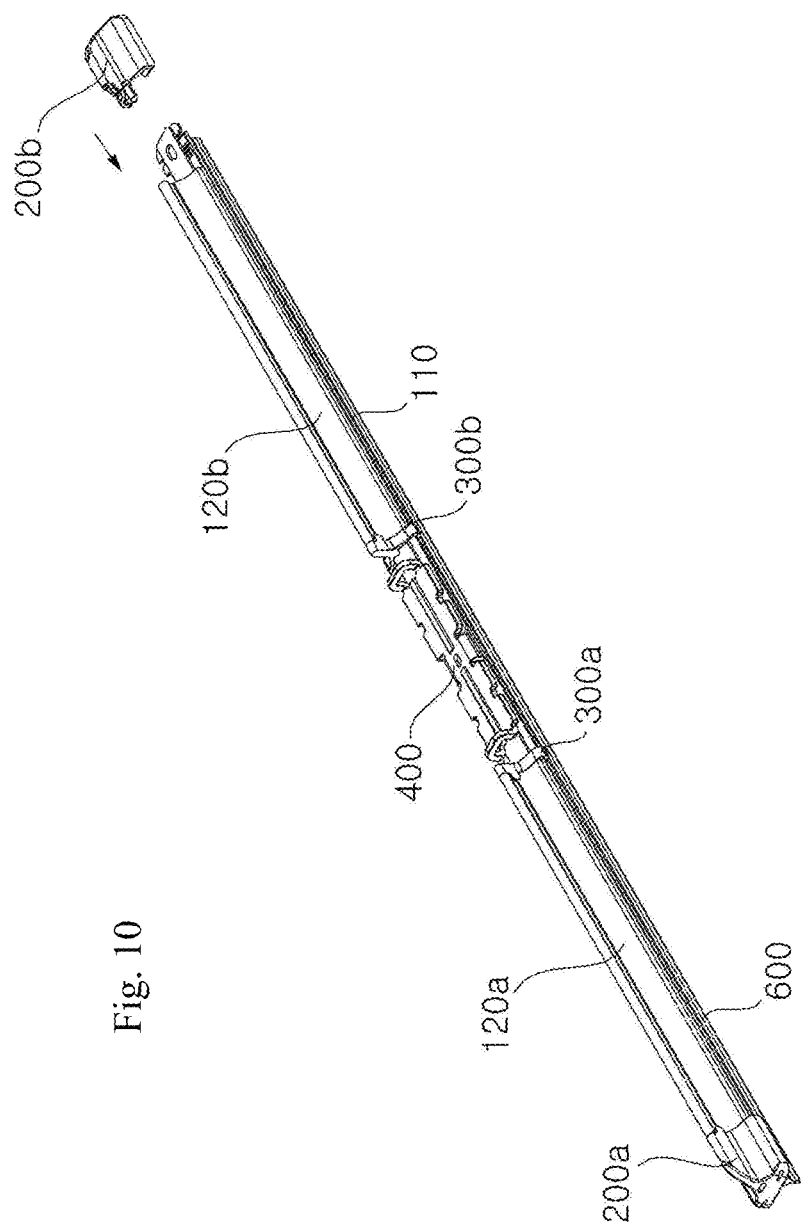
FIG. 10 is an exploded perspective view illustrating a procedure of coupling a second outer plug, which is one of the components illustrated in FIG. 1, after the procedure of coupling the wiping rubber member.

FIG. 9 is a perspective view illustrating a procedure of coupling the wiping rubber member 600, which is one of the components illustrated in FIG. 1. FIG. 10 is an exploded perspective view illustrating a procedure of coupling the second outer plug 200, which is one of the components illustrated in FIG. 1, after the procedure of coupling the wiping rubber member 600.

After the adapter holder bracket 400 is fitted in the recess 140, the wiping rubber member 600 is coupled to the base part 110 before the second outer plug 200b, among the first outer plug 200a and the second outer plug 200b, which is not yet coupled, is coupled in the coupling space 130b defined in the end of the spoiler 110, 120, as illustrated in FIG. 9.

As illustrated in FIG. 9, the base part 110 is provided on the lower part thereof with a retainer 150 (various embodiments of which are illustrated in FIGS. 21a to 26) for coupling to the upper end of the wiping rubber member 600. The specific coupling structure between the retainer 150 and the wiping rubber member 600 will be described later.

The wiping rubber member 600 is fitted in a portion of the retainer 150, which corresponds to the second end 130b of the spoiler 110, 120, to which the outer plug 200 is not yet coupled, and is slidably moved to the first end to complete of the coupling.

As illustrated in FIG. 10, the second outer plug 200b, which is not yet coupled, is coupled in the coupling space 130b defined in the second end of the spoiler 110, 120 in the same manner as the manner in which the first outer plug 200a is coupled to the spoiler 110, 120.

Figure 11:
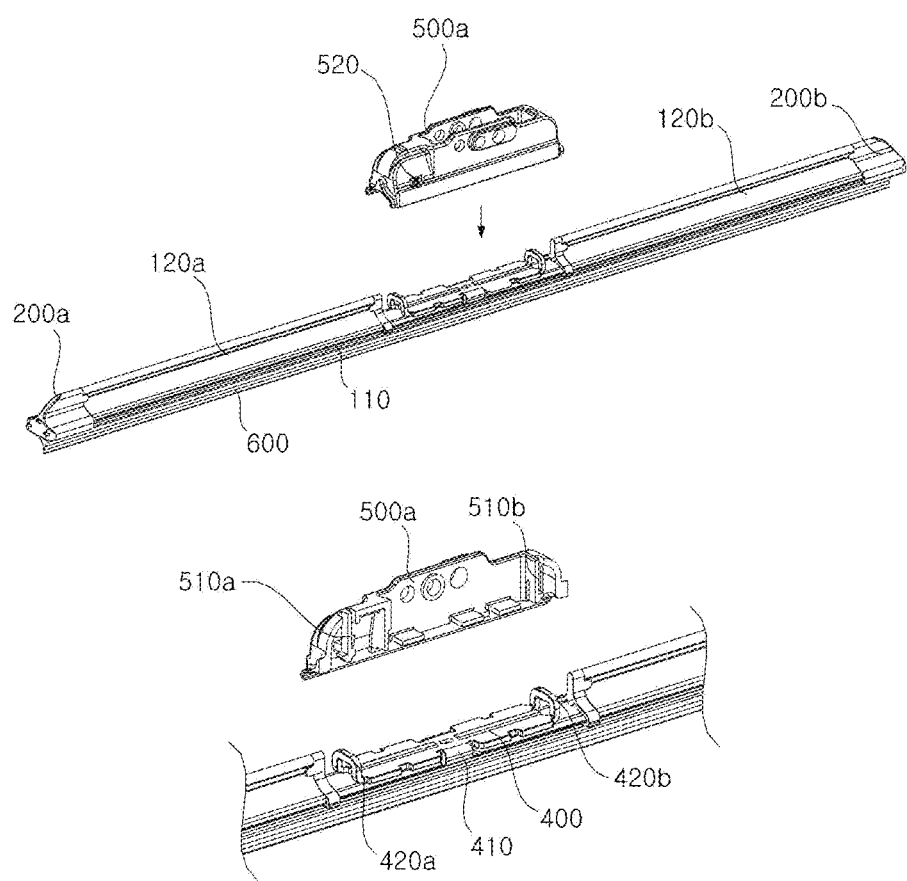
FIG. 11 includes an exploded perspective view and a partially broken-away perspective view, which illustrate a procedure of coupling the adapter holder to the adapter holder bracket, which are components illustrated in FIG. 1.
Figure 12:
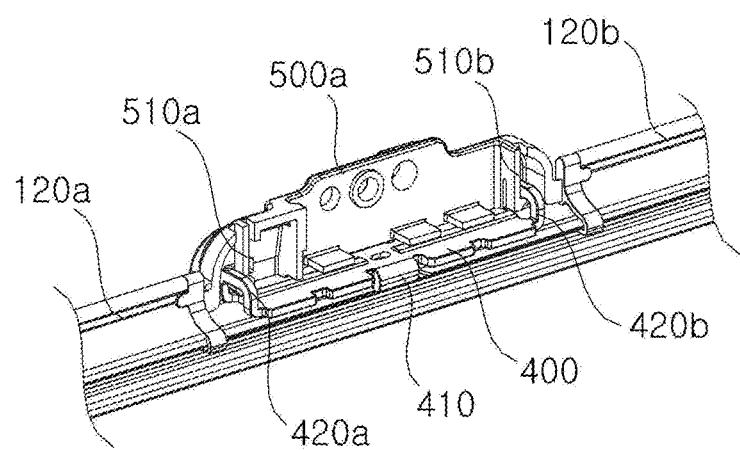
FIG. 12 is a partially broken-away perspective view illustrating the state in which the adapter holder is coupled to the adapter holder bracket, which are illustrated in FIG. 11.
Figure 13:
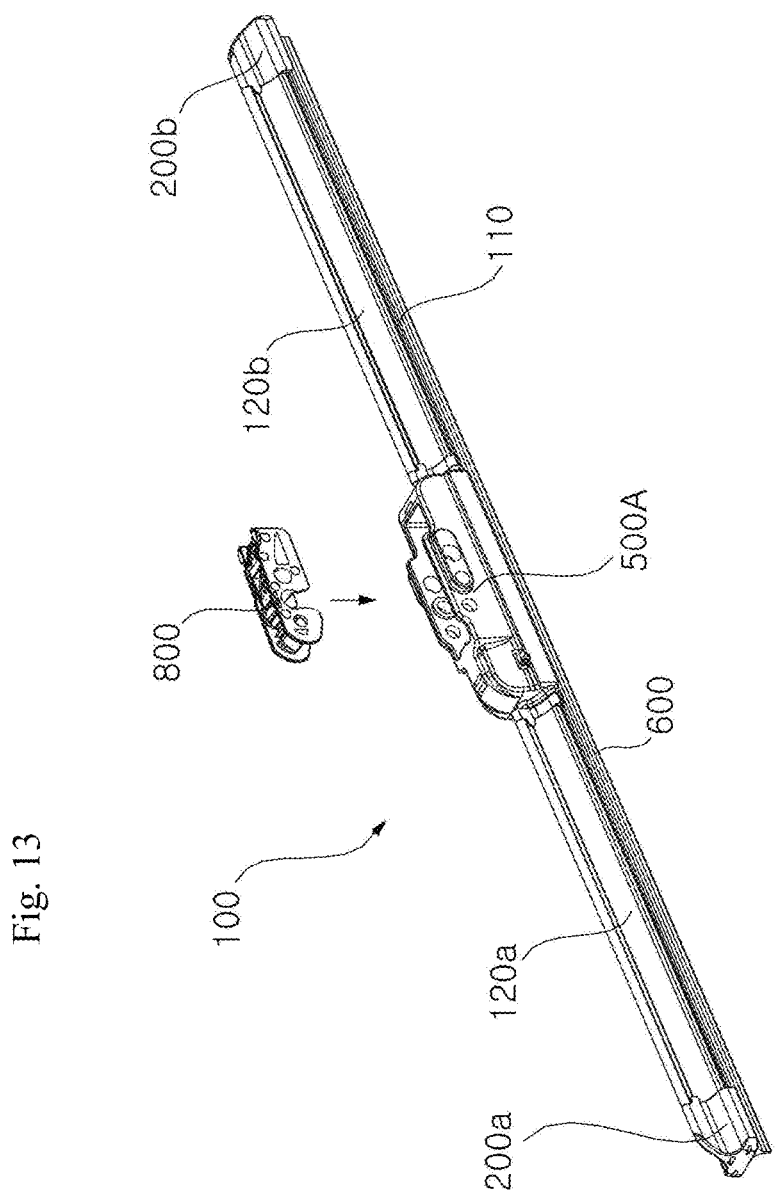
FIG. 13 is an exploded perspective view illustrating a procedure of coupling an adapter coupled to the adapter holder, which are components illustrated in FIG. 1.
Figure 14:
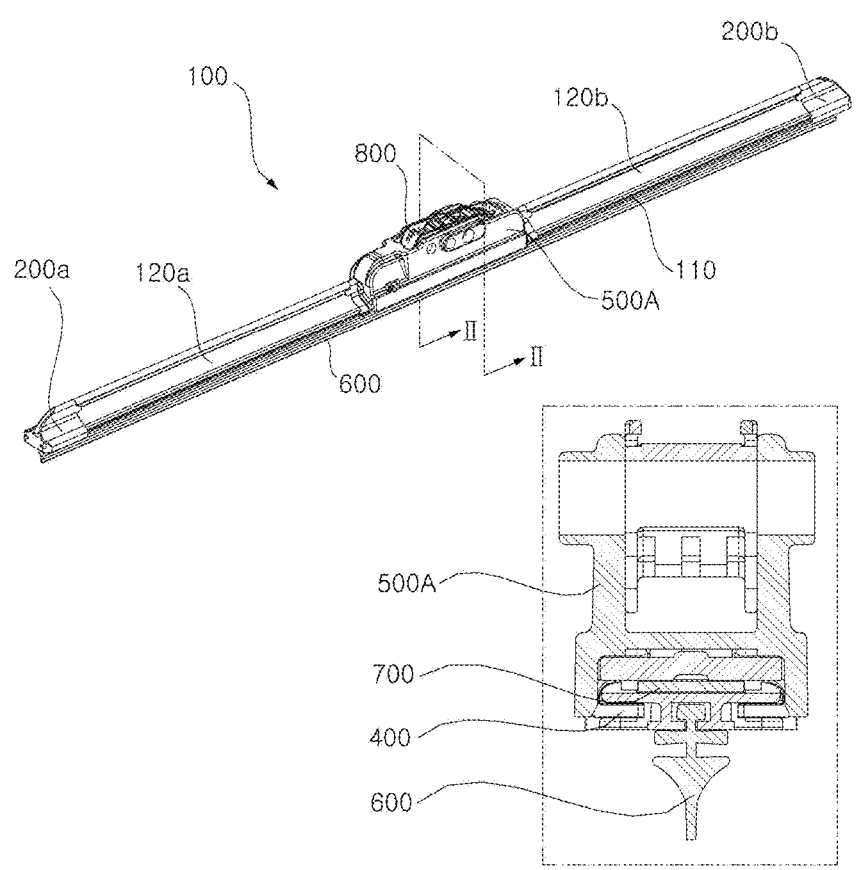
FIG. 14 includes a perspective view and a cross-sectional view, which illustrate the state in which the adapter is coupled to the adapter holder, which are illustrated in FIG. 13.
Figure 15A:
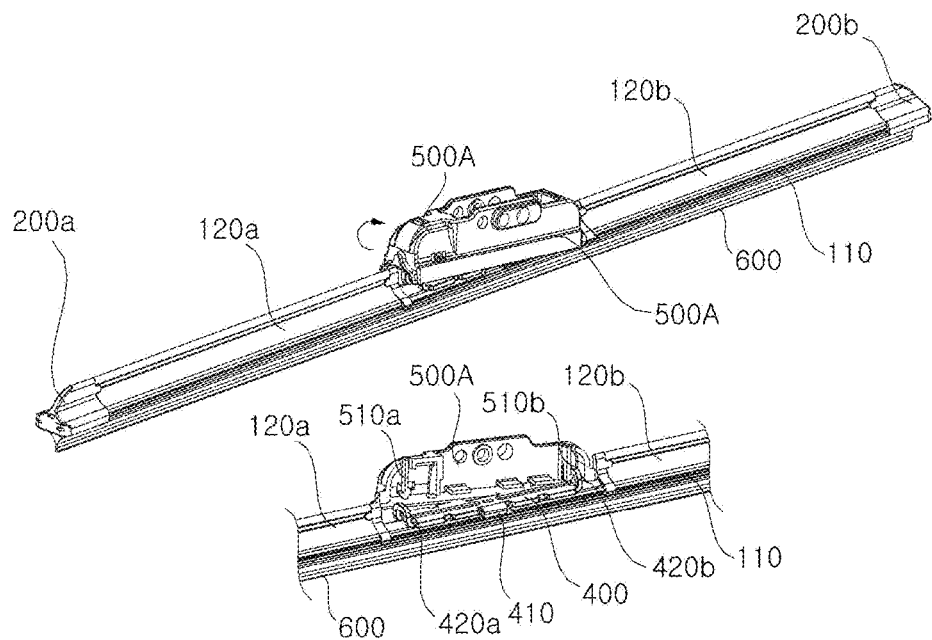
FIGS. 15(a) and 15(b) include an operational view and a partially broken-away perspective view, which illustrate dismantlement of the adapter holder, which is one of the components illustrated in FIG. 1.
Figure 15B:
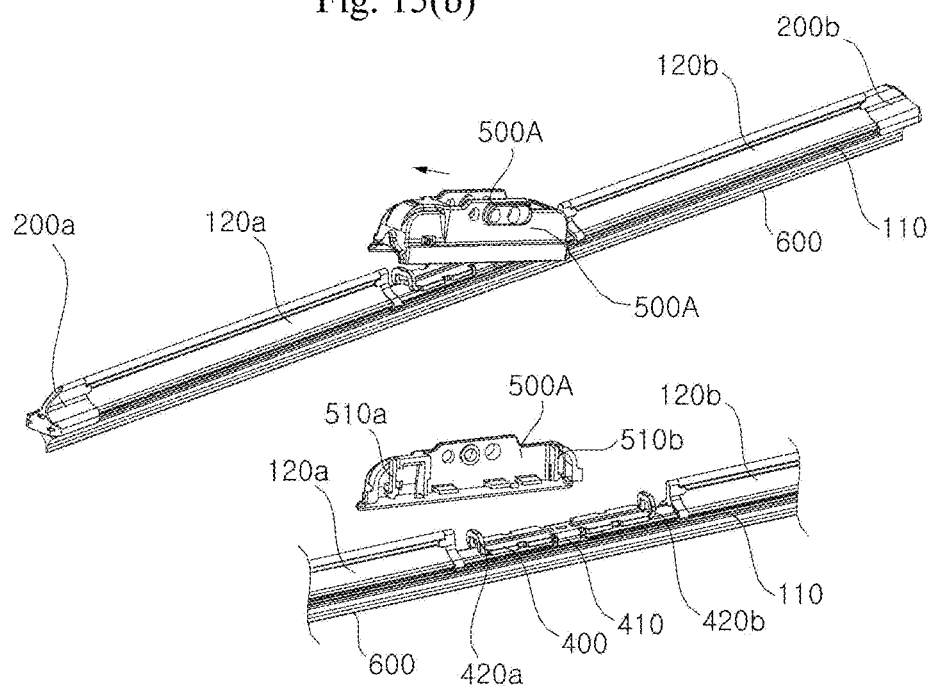
Figure 16:
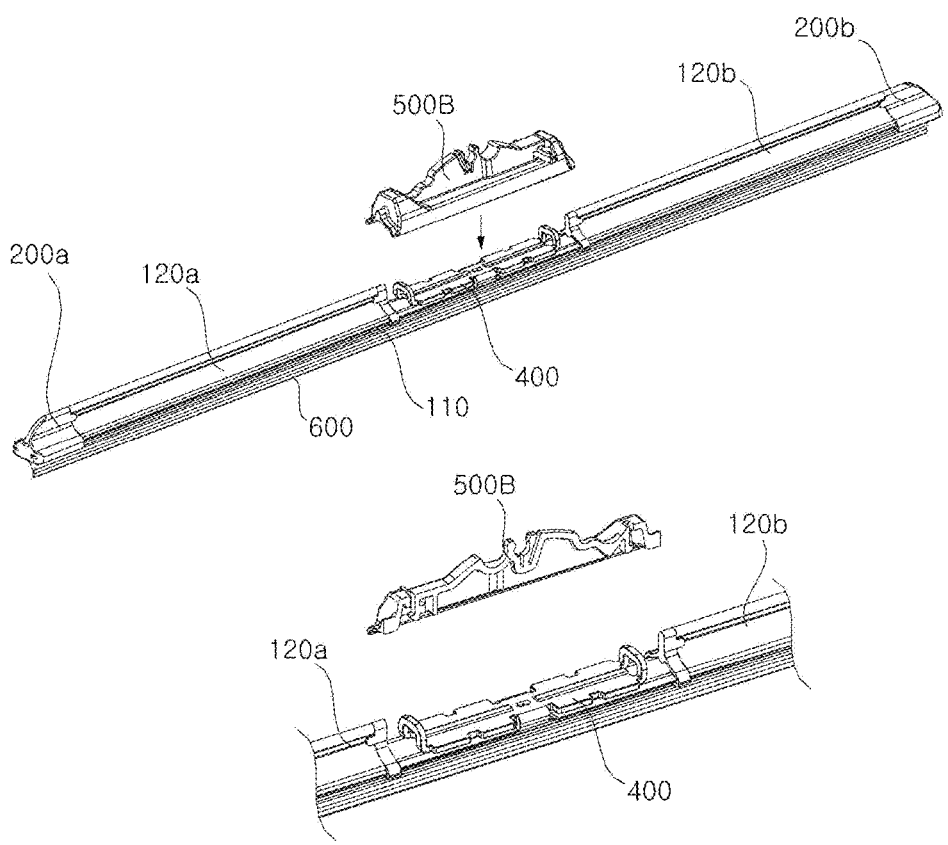
FIG. 16 includes an exploded perspective view and a partially broken-away perspective view, which illustrate a procedure of coupling a modified adapter holder to the adapter holder bracket, which is one of the components illustrated in FIG. 1.
Figure 17:
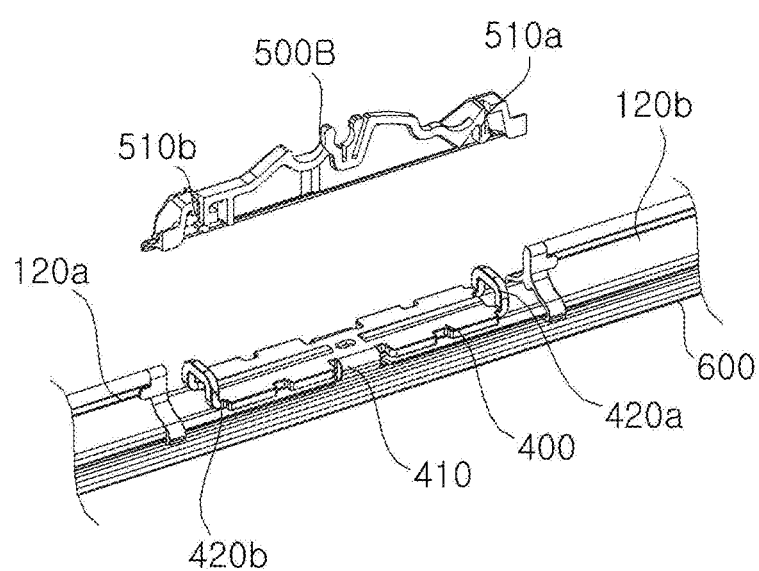
FIG. 17 is an enlarged view of the exploded perspective view illustrated in FIG. 16.
Figure 18A:
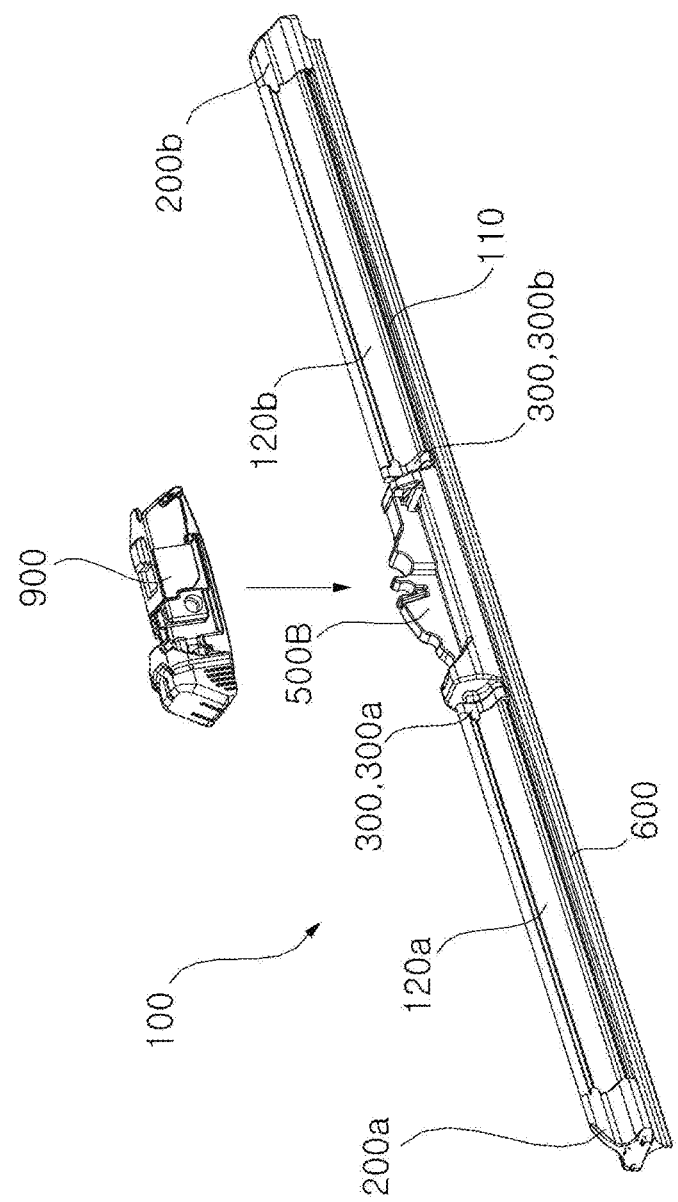
FIGS. 18a and 18b are exploded perspective views illustrating procedures of coupling various types of adapters to the adapter holder, which is one of the components illustrated in FIG. 1d.
Figure 18B:
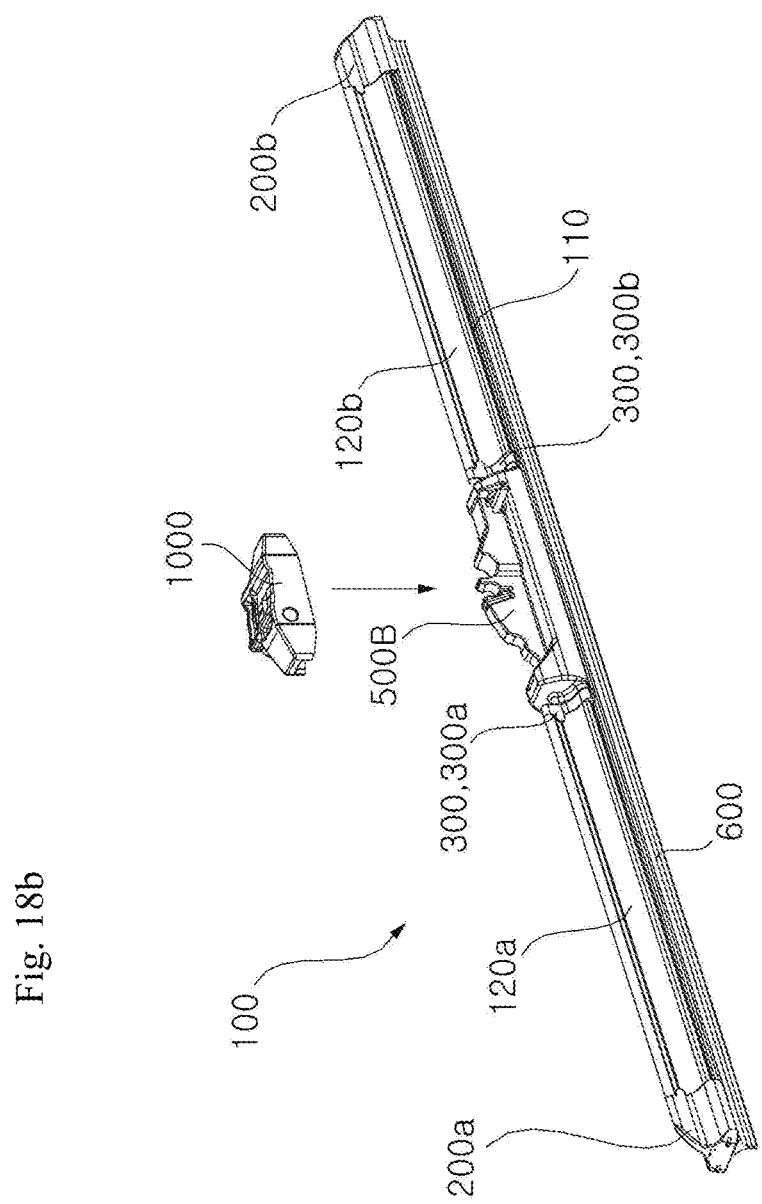

FIG. 11 includes an exploded perspective view and a partially broken-away perspective view, which illustrates a procedure of coupling the adapter holder 500A to the adapter holder bracket 400, which are components illustrated in FIG. 1. FIG. 12 is a partially broken-away perspective view illustrating the state in which the adapter holder 500A is coupled to the adapter holder bracket 400, which are illustrated in FIG. 11. FIG. 13 is an exploded perspective view illustrating a procedure of coupling the adapter 800 to the adapter holder 500A, which are components illustrated in FIG. 1. FIG. 14 includes a perspective view and a cross-sectional view, which illustrate the state in which the adapter 800 is coupled to the adapter holder 500A, which are illustrated in FIG. 13. FIGS. 15(a) and 15(b) include an operational view and a partially broken-away perspective view, which illustrate the dismantlement of the adapter holder 500A, which is one of the components illustrated in FIG. 1. FIG. 16 includes an exploded perspective view and a partially broken-away perspective view, which illustrate a procedure of coupling a modified adapter holder 500B to the adapter holder bracket 400, which is one of the components illustrated in FIG. 1. FIG. 17 is an enlarged view of the exploded perspective view illustrated in FIG. 16. FIGS. 18a and 18b are exploded perspective views illustrating procedures of coupling various types of adapters 900 and 1000 to the adapter holder 500B, which is one of the components illustrated in FIG. 1.

When the first outer plug 200a and the second outer plug 200b are coupled to the spoiler 110, 120, the remaining components of the adapter assembly, excluding the adapter holder bracket 400, are coupled to the adapter holder bracket 400, as illustrated in FIGS. 11 to 18b.

Any type of adapter holder may be coupled to the adapter holder bracket 400 without limitation, as long as the adapter holder includes the first hook protrusion 510a and the second hook protrusion 510b, which are capable of being coupled to the first hook ring 420a and the second hook ring 420b, which are formed on the adapter holder bracket 400.

In other words, the adapter holder bracket 400 is configured to have a structure, which allows various types of adapter holders 500A or 500B to be coupled thereto.

More specifically, as illustrated in FIGS. 11 and 12, the first adapter holder 500A, which is a first type of adapter holder, may be coupled to the adapter holder bracket 400.

The first adapter holder 500A may be configured to have a rectangular parallelepiped form, and may be provided with a hinge rib (not shown), to which one of various types of adapters 800, 900 and 1000, suitable for the adapter holder, is hingedly coupled. As described above, the first adapter holder 500A may be provided therein with the first hook protrusion 510a and the second hook protrusion 510b, which are respectively engaged with the first hook ring 420a and the second hook ring 420b, which are provided on the adapter holder bracket 400.

When the first adapter holder 500A is coupled to the adapter holder bracket 400, the first adapter holder 500A is forcibly moved downward from above such that the first hook protrusion 510a and the second hook protrusion 510b are simultaneously pressed into the first hook ring 420a and the second hook ring 420b and are hooked thereto. To this end, the first hook ring 420a and the second hook ring 420b of the adaptor holder bracket 400 are inserted into the first adapter holder 500A.

After the first adapter holder 500A is coupled to the adapter holder bracket 400 in this manner, the first adapter 800, which is suitable for the first adapter holder 500A, is moved downward from above so as to be hingedly coupled to the hinge rib, as illustrated in FIGS. 13 and 14.

As illustrated in FIGS. 15(a) and 15(b), the first adapter holder 500A may be dismantled from the adapter holder bracket 400 in a manner that is different from the manner in which the first adapter holder 500A is coupled to the adapter holder bracket 400.

More specifically, the first adapter holder 500A may be provided with a release lever 520, which is connected to at least one of the first hook protrusion 510a and the second hook protrusion 510b and projects outward therethrough.

The release lever 520 may be connected to one of the first and second hook protrusions 510a and 510b, and may project outward through the lateral side walls of the first adapter holder 500A.

When there is a necessity to repair or replace the windshield wiper blade 100 due to failure thereof, the release lever 520 serves to make it easy to remove the first adapter holder 500A from the adapter holder bracket 400.

In the case in which the release lever 520 is provided at the first hook protrusion 510a, when the first hook protrusion 510a is released from the engagement with the first hook ring 420a by pulling the release lever 520, the first adapter holder 500A is rotatable upward with respect to the second hook ring 420b, thereby allowing the first adapter holder 500A to be dismantled from the adapter holder bracket 400, as illustrated in FIG. 15.

In the embodiment of the windshield wiper blade 100 according to the present invention, the adapter holder may be embodied not only as the first adapter holder 500A but also as the modified adapter holder 500B, which is removably coupled to the adapter holder bracket 400, as is illustrated in FIGS. 16 and 17. Here, the modified adapter holder 500B will be referred to as "a second adapter holder 500B" for convenience of explanation.

The second adapter holder 500B may, of course, be provided with the first hook protrusion 510a and the second hook protrusion 510b, which are respectively hooked to the first hook ring 420a and the second hook ring 420b, and the release lever 520.

Since the second adapter holder 500B is different from the first adapter holder 500A only in the region to which the adapter is coupled, and since it is coupled to and dismantled from the adapter holder bracket 400 in the same manner as the first adapter holder 500A, a detailed description thereof is omitted.

FIGS. 18a and 18b are exploded perspective views illustrating procedures of coupling various types of adapters to the adapter holder 500B, which is one of the components illustrated in FIG. 1.

Here, the case, in which the second adapter holder 500B, serving as the adapter holder, is coupled to the adapter holder bracket 400, will be described for convenience of explanation. The adapters coupled to the second adapter holder 500B are referred to as a second adapter 900 and a third adapter 1000, and are respectively denoted by reference numerals "900" and "1000", in order to distinguish them from the adapter illustrated in FIGS. 13 and 14.

As illustrated in FIGS. 18a and 18b, the second adapter 900 or the third adapter 1000 is moved downward from above the second adapter holder 500B, and is coupled to the second adapter holder 500b so as to cover a portion of the upper part of the second adapter holder 500B. The second adapter 900 or the third adapter 1000 may be provided therein with a hinge rib (not shown) capable of being hingedly coupled to the second adapter holder 500B, and the second adapter holder 500B may be correspondingly provided with a hinge hole (not shown) into which the hinge rib is fitted.

Although not illustrated in the drawings, the second adapter 900 is an adapter suitable for a driving arm, which is disposed at the front end thereof immediately above the spoiler 110, 120 and is disposed parallel to the spoiler 110, 120, among various types of driving arms, and the third adapter 1000 is an adapter suitable for a driving arm, which is disposed at the front end thereof at a position deviating from a position immediately above the spoiler 110, 120 and is oriented parallel to the spoiler 110, 120, among various types of driving arms.

Figure 19:
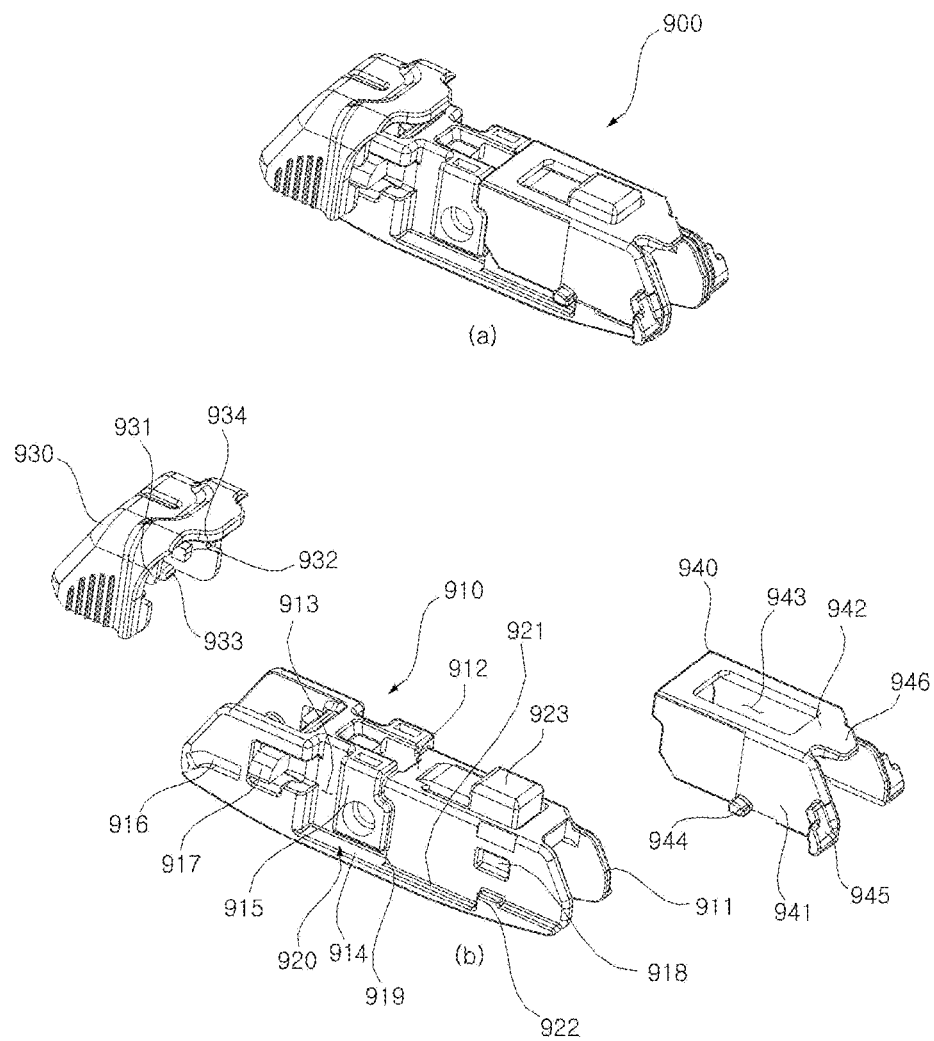
Figure 20:
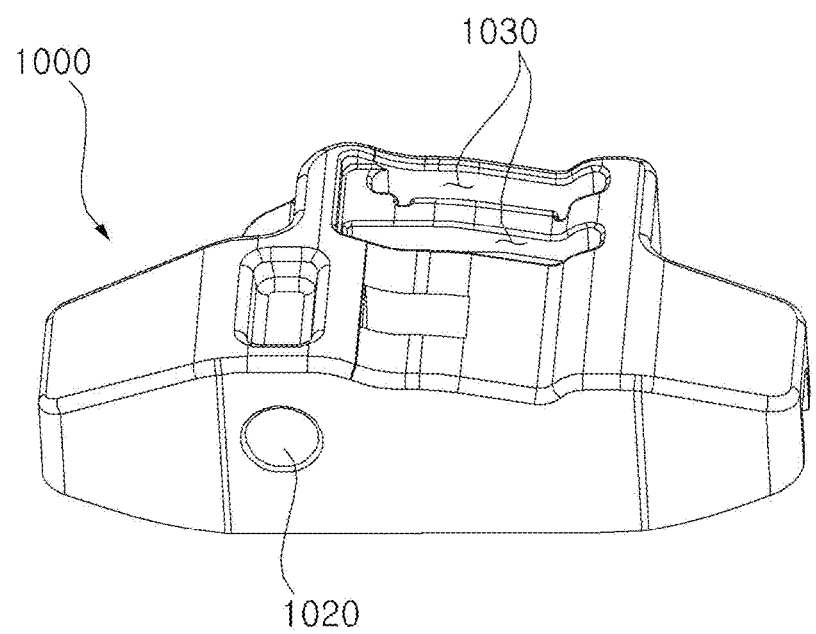
FIG. 20 is a perspective view illustrating the third adapter illustrated in FIG. 18b.

FIG. 19 includes a perspective view and an exploded perspective view, which illustrate the second adapter 900 illustrated in FIG. 18a. FIG. 20 is a perspective view illustrating the third adapter 1000 illustrated in FIG. 18b.

The second adapter 900 will be described first. As illustrated in FIG. 19, the second adapter 900 may include a body 910 coupled to the second adapter holder 500B, a cap 930 coupled to an end of the body 910 in an manner of being linearly movable and rotatable, and a sleeve 940, which is optionally coupled to the other end of the body 910 as desired by a user depending on the type of a driving arm coupled to the body 910.

As described above, the driving arm (not shown) is coupled to the second adapter 900 while covering the upper part of the second adapter 900. The driving arm may include a type of driving arm that is coupled to the second adapter 900 in such a manner that one end of the driving arm is engaged with the second adapter 900 and the other end of the driving arm is rotated, and another type of driving arm, which is coupled to the second adapter 900 in such a manner that the driving arm is linearly moved downward from above the second adapter 900 so as to cover the body 910 of the second adapter 900 and is then linearly moved in the longitudinal direction of the second adapter 900 so as to be engaged with the body 910.

Furthermore, the driving arm (not shown) may include still another type of driving arm, which is coupled to the second adapter 900 in such a manner that the driving arm is engaged with one end of the sleeve 940 coupled to the body 910 and is then rotated, and a further type of driving arm, which is coupled to the second adapter 900 in such a manner that the driving arm is coupled to the body 910 while being rotated in the state in which the sleeve 940 is removed from the body 910.

The sleeve 940 is intended to accommodate any of various types of driving arms, which are coupled to the body 910. Specifically, the sleeve 940 is removed from the body 910 in the case in which a driving arm surrounding the body 910 has a smaller width, and is coupled to the body 910 in the case in which a driving arm surrounding the body 910 has a greater width, thereby accommodating any of various types of driving arms.

As illustrated in FIG. 19, one end of the second adapter 900, to which the cap 930 is coupled, may be referred to as a head (denoted by no reference numeral), and the other end of the second adapter 900, to which the sleeve 940 is coupled, may be referred to as a tail (denoted by no reference numeral). Each of the head and tail is provided with projecting walls, which are oriented parallel to each other. The projecting walls 911 are connected to each other at the upper ends thereof via a connector 912. The pair of projecting walls 911 may define a predetermined space therebetween so as to surround a portion of the upper end of the second adapter holder 550B. The predetermined space may be provided with a fin rib (not shown) for connecting the pair of projecting walls 911 to each other.

The body 910 may be provided with a cantilever-type elastic projection 923, which is connected to the upper portion of the tail of the body 910 so as to provide elastic force.

The cap 930 may be coupled to the body 910 in one direction so as to surround the head. The cap 930 may be linearly movable in a horizontal direction by a predetermined distance with respect to the coupled point of the head, and may be rotatable.

The portion of the body 910 that is provided with the cap 630, may be provided therein with a connecting rod (not shown), which is similar to the above-mentioned fin rib, so as to connect the pair of projecting walls 911 to each other. The connecting rod is engaged with a fork protrusion 931, provided in the cap 930, so as to prevent displacement of the cap 930 when the cap 930 is linearly moved to the closed position from the open position.

The cap 930 may be provided therein with hinge steps 932, serving as the rotational center, in addition to the above-mentioned fork protrusion 931. When the cap 930 is coupled to the body 910 so as to surround the head of the body 910, the hinge steps 932 are fitted into hinge holding slots 916 formed in the pair of projecting walls 911, which correspond to the head. Consequently, the hinge steps 932 serves to guide the cap 930 during linear movement of the cap 930 and serve as the rotational center of the cap 930 during rotation of the cap 930.

The cap 930 may further be provided with a pair of support pieces 933, which extend toward the connecting rod so as to support a lower portion of the connecting rod when the above-mentioned fork protrusion 931 comes into contact with the connecting rod.

The hinge holding slot 916 in the body 910 may be machined so as to receive therein the above-mentioned hinge steps 932, and may extend horizontally so as to allow the hinge steps 932 to be moved horizontally by a predetermined distance.

Since the hinge steps 932 are fitted into the hinge holding slots 916, the cap 930 may open or close the head of the body 910 by rotating about the hinge steps. Furthermore, when the front end of a driving arm is coupled to the head of the body 910, the cap 930 is linearly moved toward the driving arm while the head is opened, and is rotated so as to engage with the front end of the driving arm and to close the head, thereby securely holding the driving arm. At this time, the connecting rod of the body 910 is forcibly engaged with the fork protrusion 931 and the support pieces 933, thereby preventing displacement of the cap 930.

The head of the body 910 may be provided with bias members 917, which extend outward through the cap 930, and the cap 930 may be correspondingly provided with member slots 934, which receive the bias members 917 during linear movement of the cap 930. When the connecting rod is engaged with the fork protrusion 931 and the support pieces 933 by linear movement of the cap 930, the bias members 917 are inserted into the member slots 934 formed in the cap 930, thereby blocking rotation of the cap 930.

As illustrated in FIG. 19, the body 910 of the second adapter 900 is provided in the lateral sides thereof with approximately "L"-shaped coupling grooves 920 so as to enable a type of driving arm, which is coupled by linearly moving vertically and then horizontally, to be coupled to the body 910. Although not illustrated in the drawings, the driving arm may be provided at the lower end of lateral sides thereof with separation-blocking ribs (not shown), which are guided along the coupling grooves 920 and are linearly moved so as to be engaged with the body 910. The coupling grooves 920 may be respectively provided on the outer surfaces of the pair of projecting walls 911, which constitute the body 910.

Hereinafter, a vertical section of the coupling groove 920, which is formed vertically, will be referred to as a vertical groove 913, and a horizontal section of the coupling groove 920, which extends horizontally from the lower end of the vertical groove 913, will be referred to as a horizontal groove 914, for convenience of explanation.

An area of the body 910, at which the vertical groove 913 and the horizontal groove 914 cross each other, may be provided with a first upper engagement step 915, with which a driving arm is engaged so as to restrict movement of the driving arm in an upward direction. The first upper engagement step 915 is the outer surface portion of each of the pair of projecting walls 911 by which the vertical groove 913 and the horizontal groove 914 are defined. Accordingly, the body 910 may have increased width such that the separation-blocking rib, which is horizontally provided on the lower portion on the lateral side of the driving arm, is engaged with the first upper engagement step 915.

The separation-blocking rib, which is provided on the lower portion of the lateral side of the driving arm, may have a smaller horizontal length or a greater horizontal length depending on the type of the driving arm.

The horizontal groove 914 may be provided at a portion thereof spaced apart from the vertical groove 913 with a first horizontal engagement step 919, with which another type of driving arm is engaged horizontally (i.e., longitudinally). The first horizontal engagement step 919 is formed by increasing the width of the body 910 so as to have a smaller width than the first upper engagement step 915 but to have a greater width than the coupling groove 920. The first horizontal engagement step 919 is engaged with an end of a separation-blocking rib of a driving arm, which is a type of driving arm having a relatively short rib.

The horizontal groove 914 may be provided at an end thereof with a horizontal groove extension 921, which further extends from the horizontal groove 914 so as to accommodate various types of driving arms. The horizontal groove extension 921 is a portion, which is further provided so as to accommodate a type of driving arm having a relatively long separation-blocking rib. The horizontal groove extension 921 is provided at the end thereof with a second horizontal engagement step 922, with which the end of the separation-blocking rib is engaged.

As illustrated in FIG. 19, the sleeve 940 may include a pair of parallel walls 941 and a connecting wall 942 connecting the pair of parallel walls 941 to each other.

The connecting wall 942 is provided with a through hole 943, through which the above-mentioned elastic projection 923 of the body 910 passes. Each of the parallel walls 941 has a predetermined thickness. When the sleeve 940 is coupled to the tail of the body 910, the above-mentioned horizontal groove extension 921 is defined between the parallel wall 910 and the projecting wall 911 of the body 910. The elastic projection 923 may pass through the through hole 943, and may project upward by a predetermined height.

The pair of parallel walls 941 may be parallel to and spaced apart from each other by a predetermined distance, and may be provided on the inner surfaces thereof with engagement steps (not shown), which are engaged with sleeve engagement holes 918 formed in the tail of the body 910. When the sleeve engagement steps are engaged with the sleeve engagement holes 918, the sleeve 940 is integrally secured to the body 910.

The parallel wall 941 may be provided at the center of the lower end thereof with a first sleeve stopper protrusion 944, which is engaged with a driving arm so as to restrict the movement of the driving arm in a horizontal direction, thereby accommodating various types of driving arms. The parallel wall 941 may be provided at the end thereof with a second sleeve stopper protrusion 945, which is engaged with a driving arm so as to restrict movement of the driving arm in a horizontal direction, thereby accommodating various types of driving arms.

The second sleeve stopper protrusion 945 may further extend outward so as to have a greater width than the first sleeve stopper protrusion 944.

In the case of a driving arm, which is coupled to the second adapter 900 in such a manner that one end of the driving arm is rotated toward the head of the body 910 while the other end of the driving arm is secured to the tail of the body 910, serving as the rotational center, and the driving arm is held by the cap 930, the second sleeve stopper protrusion 945 may serve to be engaged with a locking end (not shown) formed at the lower end of the driving arm so as to restrict the movement of the driving arm.

Since the horizontal groove extension 921 is defined between the sleeve 940 and the outer surface of the projecting wall 911 of the body 910, as described above, a type of driving arm, which has the separation-blocking rib having such a length as to be fitted into the horizontal groove extension 921, is engaged with the horizontal groove extension 921 so as to be restricted in upward movement.

Accordingly, when a driving arm, which is coupled to the second adapter 900 in such a manner that one end of the driving arm is rotated while the other end of the driving arm is secured or a driving arm, which has such a long separation-blocking rib that the separation-blocking rib formed at the lower end of the lateral side of the driving arm is at least partially positioned in the horizontal groove extension 921, is coupled, the sleeve 940 may be coupled to the body 910 so as to fulfill two functions (that is, a function of serving as a rotational center for coupling and a function of restricting the upward movement of a driving arm). Alternatively, other types of driving arms may be coupled to the second adapter 900 in the state in which the sleeve 940 is removed from the body 910.

The connecting wall 942 of the sleeve 940 may be provided with a coupling projection 946, which fulfills the same function as that of the second stopper protrusion 945, so as to accommodate a type of driving arm that is coupled while being rotated but does not have the second sleeve stopper protrusion 945.

As illustrated in FIG. 20, the third adapter 1000 is used for connection of a type of driving arm, which is disposed at the front end thereof at a position deviating from immediately above the spoiler 110, 120 in one longitudinal direction and is oriented parallel to the spoiler 110, 120.

The third adapter 1000 is provided in a lateral side wall thereof with a pin-fitting hole 1020, through which a side pin of a driving arm (not shown) is fitted. Accordingly, the side pin of the driving arm, which extends through the pin-fitting hole 1020, is fitted into a hinge hole formed in the second adapter holder 500B, and, as such, the third adapter 1000 is securely coupled to the second adapter holder 500B. However, the side pin of the driving arm is not necessarily fitted into the hinge hole. A hinge rib formed on the third adapter 1000 may be fitted into the hinge hole formed in the second adapter holder 500B, and the side pin of the driving arm may be fitted into another coupling hole (denoted by no reference number) formed in the second adapter holder 500B through the above-mentioned pin-fitting hole 1020.

The third adapter 1000 may be provided in the upper wall thereof with a protrusion coupling hole 1030, into which a fork protrusion of a type of driving arm that is bent into an approximately inverted "L"-shape is fitted. The driving arm may be coupled in such a manner as to fit the fork protrusion into the protrusion coupling hole 1030 for engagement thereof.

The third adapter 1000 also has a predetermined space such that the third adapter 1000 is moved downward so as to surround a portion of the upper end of the second adapter holder 500B.

Figure 21A:
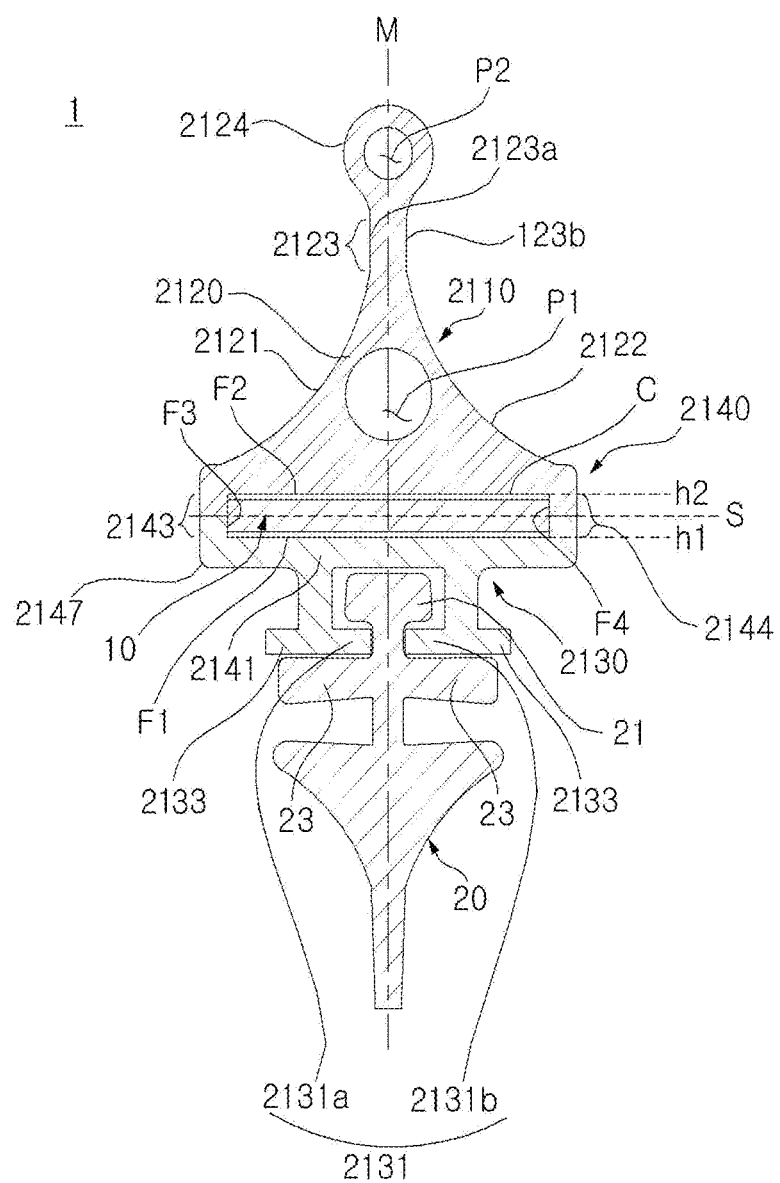
FIG. 21a is a cross-sectional view taken along line 21a-21a in FIG. 1.
Figure 21B:
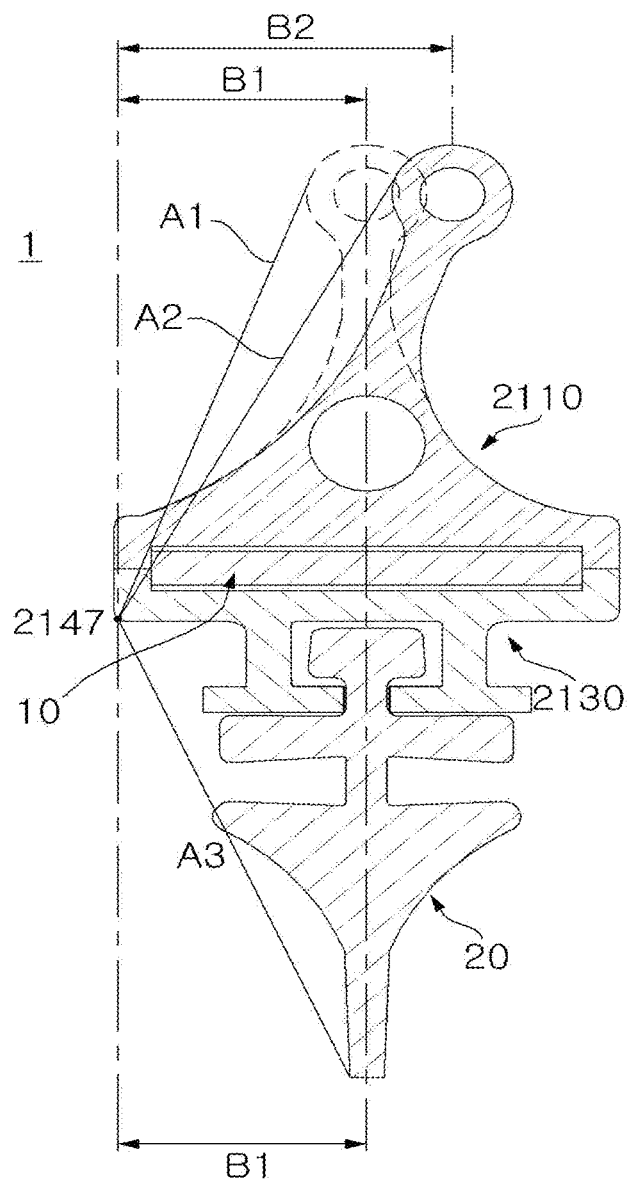
FIG. 21b is a cross-sectional view illustrating the spoiler illustrated in FIG. 21a, which is deformed by wind.

FIG. 21a is a cross-sectional view taken along line 21a-21a in FIG. 1. FIG. 21b is a cross-sectional view illustrating the spoiler 110, 120 illustrated in FIG. 21a, which is deformed by wind. FIGS. 22 to 26 are cross-sectional views illustrating spoilers 110, 120, which are applied to wiper blades according to other embodiments of the present invention.

In descriptions with reference to FIGS. 21a to 26, specific components of the spoiler, such as the deflection part, the base part and the elastic member will be denoted by reference numerals, which are different from those used in the previous embodiments, in order to prevent confusion.

As illustrated in FIGS. 21a to 26, the base part 2130, which is one of the components of the spoiler, may be provided at the lower surface thereof with the retainer 2131 for coupling the end of the wiping rubber member 20 thereto.

The retainer 2131 may extend from the lower support wall 2141, which constitutes the lower surface of the base part 2130. The retainer 2131 may include a pair or claws 2131a and 2131b, which are bent toward each other and define a space therebetween so as to receive the upper end 21 of the wiping rubber member 20. The distance between the pair of claws 2131a and 2131b may be set to be smaller than the width of the upper end 21 of the wiping rubber member 20 such that the upper end 21 of the wiping rubber member 20 cannot be separated from the space.

The pair of claws 2131a and 2131 b may be provided at outer portions thereof with support ribs 2133, which extend outward in a width direction so as to support flanges 23 of the wiping rubber member 20, which are provided under the upper end 21 of the wiping rubber member 20 and have a predetermined width. Since the pair of claws 2131a and 2131 b and the support ribs 2133 are components constituting the base part 2130, they are preferably made of the same hard material as the base part 2130.

The support ribs 2133 have a greater width than the support flanges 23 of the wiping rubber member 20. Accordingly, since the support flanges 23 of the wiping rubber member 20 are supported by the support ribs 2133 when the wiping rubber member 20 is bent under the base part 2130 during the rotation of the wiping rubber member 20 on the surface of the windshield, it is possible to offer a stable and efficient wiping effect.

In the embodiment of the windshield wiper blade 100 according to the present invention, the elastic member 10 may extend longitudinally and may be made of a flexible material, preferably a metal plate. When the elastic member 10 is deformed by the pressure applied from a driving arm connected to a vehicle, the elastic member 10 provides the wiping rubber member 20 with elastic force, thereby pressing the wiping rubber member 20 onto the surface of the windshield.

The elastic member 10 may be shaped into an arcuate shape having a predetermined curvature in a longitudinal direction. Here, the upper surface of the elastic member 10 is convex.

The elastic member 10 may include at least one elastic member. In some embodiments, the elastic member 10 may include a pair of elastic members, which are parallel to each other. Alternatively, although the elastic member 10 may be made of a single member, the elastic member 10 may be provided with a pair of rails, which are parallel to each other.

As illustrated in FIGS. 21a and 21b, the spoiler may have at least one elastic member through hole C, which is formed between the lower retainer 2131 and the upper deflection part 2110 so as to allow the elastic member 10 to be longitudinally fitted thereinto.

The deflection part 2110 may be easily deformed because the deflection part 2110 is made of a flexible material. Since the retainer 2131, made of a hard material, holds the upper end 21 of the wiping rubber member 20 by virtue of strong gripping force thereof, the wiping rubber member 20 is not separated from the spoiler even when the wiping rubber member 20 is deflected in on direction during rotating action of the windshield wiper blade 100 according to the present invention.

The boundary between the deflection part and the base part is defined in the zone between the height h1 of the lower surface F1 of the elastic member through hole C, which faces the lower surface of the elastic member 10 that faces toward the wiping rubber member 20, and the height h2 of the upper surface F2 of the elastic member through hole C, which faces the upper surface of the elastic member 10 that faces toward the deflection part 2110. The boundary S between the deflection part 2110 and the base part 2130 is preferably defined at constant height at every location.

The section between the height h1 of the lower surface F1 of the elastic member through hole C and the height h2 of the upper surface F2 corresponds to the thickness of the elastic member 10. Since the spoiler is positively supported at this section by the elastic member 10 disposed in the elastic member through hole C, the spoiler undergoes almost no deformation, and is stably maintained. The elastic member 10 is deformed in accordance with the curvature of a surface of a windshield while being rotated on the surface of the windshield. This deformation is variation in the curvature of the elastic member in a longitudinal direction. Although the part of the spoiler that is disposed above the elastic member through hole C and is made a flexible material, may be somewhat deformed due to deformation of the elastic member 10, almost no lateral deformation of the elastic member 10 occurs. Accordingly, two lateral side walls 2143 and 2144 of the spoiler, which define the two lateral side surfaces F3 and F4 of the elastic member through hole C, are highly resistant to external force. Each of the lateral side walls 2143 and 2144 has an inner surface, which defines the lateral side surface F3 or F4 of the elastic member through hole C, and an outer surface, which defines the appearance of the spoiler.

The lateral side walls 2143 and 2144 are defined such that the lower ends of the lateral side walls 2143 and 2144 are positioned at the height of the lower surface F1 of the elastic member through hole C and the upper ends of the lateral side walls 2143 and 2144 are positioned at the height of the upper surface F2 of the elastic member through hole C. The boundary S between two different materials, that is, the flexible material and the hard material, may be defined at a point between the upper ends and the lower ends of the lateral side walls 2143 and 2144.

An intermediate part 2140 is a part that defines the lower surface F1, the upper surface F2 and the two lateral side surfaces F3 and F4 of the elastic member through hole C. The intermediate part 2140 includes the lower end of the deflection part 2110 and the upper end of the base part 2130. The intermediate part 2140 includes a lower hard support wall 2141 defining the lower surface F1, the lower end of the deflection part 2110 defining the upper surface F2, and the pair of lateral side walls 2143 and 2144 defining the two lateral side surfaces F3 and F4. As appreciated from the transverse section, the elastic member through hole C, which is defined by the intermediate part 2140, is a closed shape, which is surrounded by the lower end of the deflection part 2110, the lower support wall 2141 and the two lateral side walls 2143 and 2144.

This structure, in which the boundary S between two different materials is positioned at the lateral side walls 2143 and 2144, provides stability to the junction region between the two materials, thereby preventing the two materials from being separated from each other. Since the two different materials exhibit different deformability, the shearing forces that act on the junction region in opposite directions must be controlled to be within a predetermined range. If the boundary between the deflection part 2110 and the base part 2130 is positioned above the elastic member through hole C, intensive shearing forces are generated between the deflection part 2110 and the base part 2130 due to variation in the curvature of the elastic member 10, deflection of the base part 2130 attributable to change of rotational direction of the wiping rubber 20 or the like. Specifically, although the deflection part 2110 is deflected in a constant direction due to wind pressure while the vehicle is being driven, the rotational direction of the windshield wiper blade 100 according to the present invention is repeatedly changed by a driving arm. Accordingly, shearing forces sufficiently intense to separate the two materials from each other may be applied to the junction region between the two materials when the rotational direction is changed.

Meanwhile, in the windshield wiper blade 100 according to this embodiment, since the boundary S between the deflection part 2110 and the base part 2130 is supported by the lateral side surfaces of the elastic member 10 and is thus positioned at a region that is highly resistant to external force, shearing forces acting on the junction region between the deflection part 2110 and the base part 2130 are decreased, and separation of the junction region can be prevented.

As illustrated in FIG. 21a, the deflection part 2110 may include a pair of windswept surfaces 2121 and 2122, which are symmetrically disposed in the transverse section with respect to the longitudinal direction. FIG. 21a illustrates the pair of windswept surfaces 2121 and 2122, which are symmetrical with respect to the center line M, which divides the spoiler into two halves in the lateral direction. Owing to differences in vehicle regulation in various countries, there are times in which a driving arm must be installed so as to be rotated in the left area with respect to the rotational center and times in which a driving arm must be installed so as to be rotated in the right area with respect to the rotational center. Since the spoiler includes the pair of windswept surfaces 2121 and 2122, which are symmetrically disposed, the spoiler may be mounted on various types of vehicles, regardless of vehicle regulations.

The deflection part 2110 may be provided between the pair of windswept surfaces 2121 and 2122 with the through hole P1, which extends longitudinally, (and which is hereinafter referred as a first through hole when there is a need to distinguish the through hole P1 from the through hole P2, which will be described later, and which may be considered to have the same structure as the first holding hole 121 and the second holding hole 123). Consequently, the amount of material constituting the deflection part 2110 may be reduced. Furthermore, since the circular structure of the first through hole P1 in transverse section makes the deflection part 2110 stable, the first through hole P1 provides still higher elasticity when it is deformed due to external force, and restores the deformed structure to the normal form when the application of the external force is released.

The deflection part 2110 may include a bulging portion 2124, which extends longitudinally at the upper end of the deflection part 2110 and exhibits a profile of part of a circle when viewed in the transverse section along the longitudinal direction, the through hole P2, which is longitudinally formed in the bulging portion 2124, (hereinafter, referred to as a second through hole when there is a need to distinguish the through hole P2 from the through hole P1), and a neck portion 2123 extending downward from the bulging portion 2124. The pair of windswept surfaces 2121 and 2122 may extend from the neck portion 2123.

The neck portion 2123 may have a constant distance (hereinafter, referred to as a thickness), which is defined between one lateral side surface 2123a connected to one 2121 of the pair of windswept surfaces 2121 and 2122 and the other lateral side surface 2123b connected to the other 2122 thereof. The bulging portion 2124 preferably has a greater outer diameter than the thickness of the neck portion 2123.

As described above, the spoiler may have a vacant zone in the intermediate area thereof, in which the deflection part 2110 is not provided, so as to define the recess 140. In the intermediate area, the lower support wall 2141 of the elastic member through hole C is exposed, and the adapter holder bracket 400 is coupled to the exposed lower support wall 2141.

When a vehicle is running at a low speed, an upper windswept surface area corresponding to line A1, which is connected between the bulging portion 2124 and the lower end 2147 of the lateral side wall 2143, is greater than a lower windswept surface area corresponding to line A3, which is connected between the lower end of the wiper strip 20 and the lower end 2147 of the lateral side wall 2143. Accordingly, the pressure acting on the upper windswept surface area becomes higher than the pressure acting on the lower windswept surface area, thereby preventing the wiping rubber member 20 from being separated upward from the surface of the windshield.

Meanwhile, when a vehicle is running at a high speed, the neck portion 2123 of the spoiler is deflected rearward. Consequently, the line connecting the bulging portion 2124 and the lower end 2147 of the lateral side wall 2143 is A2, which is longer than line A1. Accordingly, the upper windswept surface area is increased, and the upward separation of the wiper strip 20 is thus reliably prevented. Specifically, as the distance between the bulging portion 2124 and the lower end 2147 is increased to A2 from A1, a length relevant to a perpendicular component of pressure acting on the upper windswept surface area is greatly increased to B2 from B1, thereby reliably preventing the upward separation of the wiping rubber member 20. In particular, even when the two windswept surfaces 2121 and 2122 are symmetrically configured, this structure enables the upper windswept surface area of the windswept surface 2121, which is struck by the wind, to be remarkably increased so as to be greater than the upper windswept surface area of the opposite windswept surface 2122.

The bulging portion 2124 containing therein the through hole P2 is able to reduce material and weight. Furthermore, since the bulging portion 2124 takes a hollow circular cylindrical form overall, the bulging portion 2124 is able to flexibly accommodate external force by being somewhat deformed by the application of wind pressure during high-speed movement of a vehicle. In particular, since it is possible to disperse stress applied to the region connected to the neck portion 2123, there is an effect of enhancing rigidity.

Since a vehicle is exposed to the external air, its endurance is affected by the external environment such as ambient weather, temperature and humidity, daily temperature range or the like. The bulging portion 2124 is able to flexibly accommodate contraction or expansion caused by the external environment, compared to a solid bulging portion without the through hole P2, thereby offering an effect of enhancing endurance.

The embodiment of the windshield wiper blade 100 according to the present invention may be embodied as spoilers according to various embodiments depending on the position of the boundary S between the flexible deflection part 2110 and the hard base part 2130.

Figure 22:
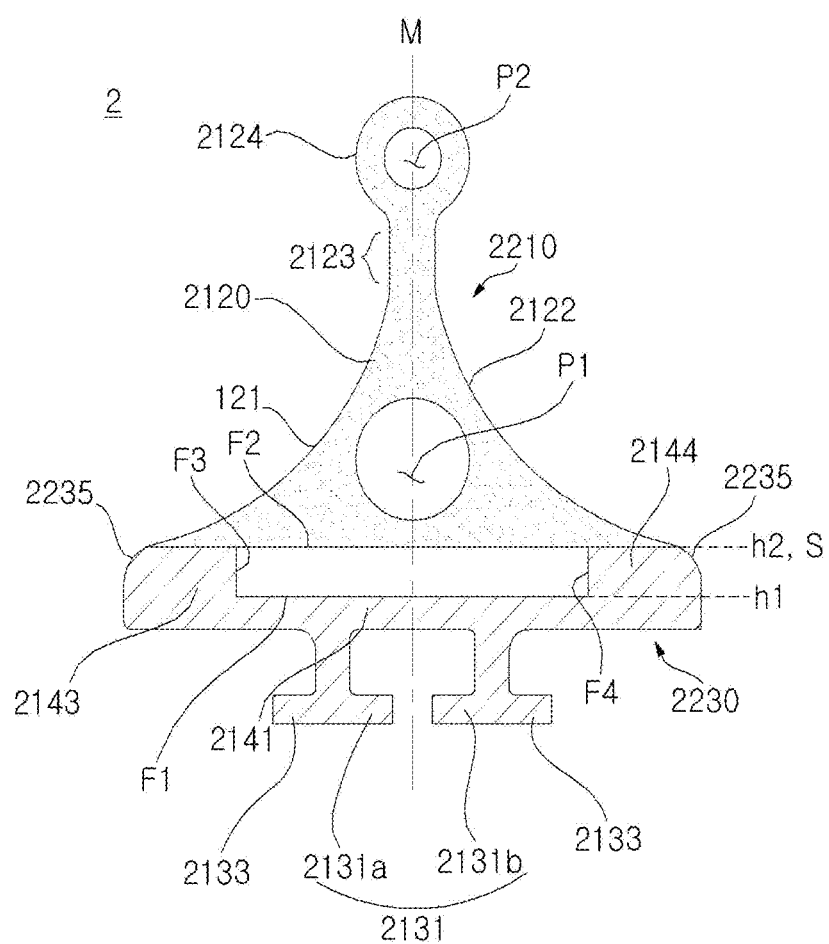
FIGS. 22 to 26 are cross-sectional views illustrating spoilers, which are applied to wiper blades according to other embodiments of the present invention.

FIG. 22 illustrates a spoiler according to a second embodiment in the embodiment of the windshield wiper blade 100 according to the present invention.

Referring to FIG. 22, in the spoiler according to the second embodiment, the boundary S, at which the flexible deflection part 2210 is bonded to the hard base part 2230, is positioned at a height h2 that is the same as the upper surface F2 of the elastic member through hole C. Since the lower end surface of the deflection part 2210 and the upper end surface of the base part 2230 are flat, it is easier to manufacture.

The base part 2230 is provided at the upper end thereof with curved surfaces 2235, which guide airflow upward along the curved surfaces from below the boundary. Accordingly, it is possible to more reliably prevent the wiping rubber member 20 from being separated upward from the surface of the windshield.

Figure 23:
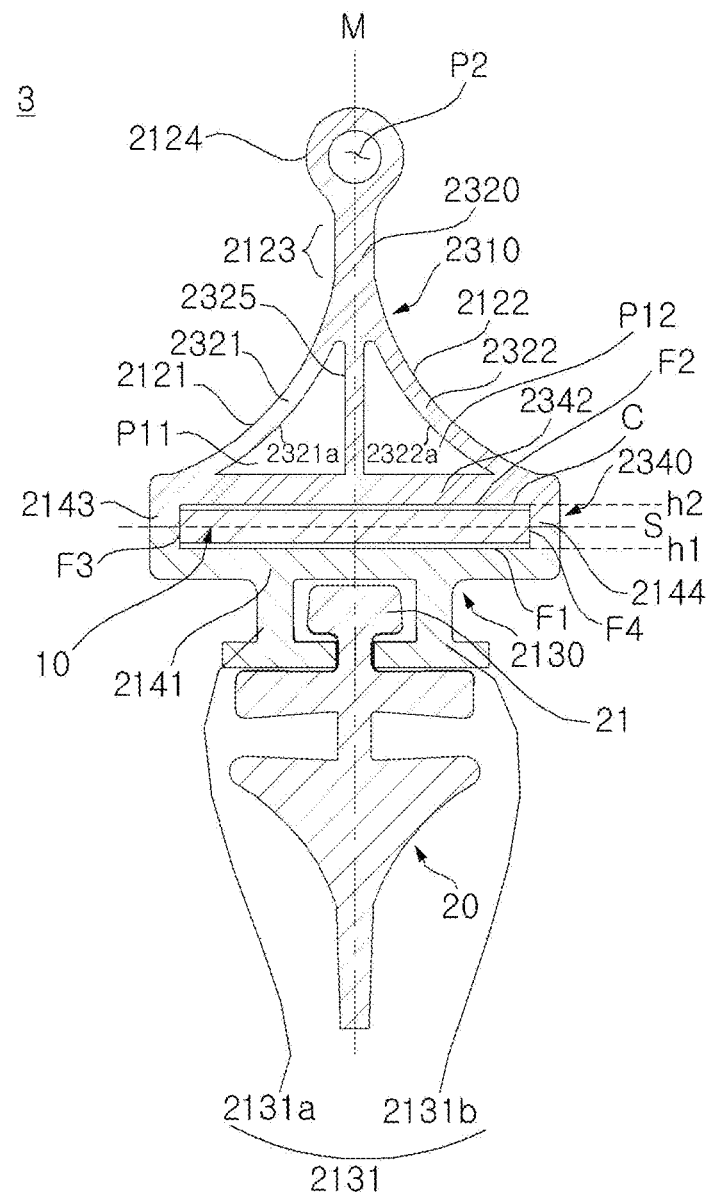

FIG. 23 illustrates a spoiler according to a third embodiment in the embodiment of the windshield wiper blade 100 according to the present invention.

Referring to FIG. 23, the spoiler according to the third embodiment includes the flexible deflection part 2310 and the hard base part 2130. The deflection part 2310 may include an upper support wall 2342, which defines the upper surface F2 of the elastic member through hole C. The immediate part 2340 having the elastic member through hole C includes an upper support wall 2342, a lower support wall 2141 and two lateral side walls 2143 and 2144.

The deflection part 2310 may include a pair of lateral side surface portions 2321 and 2322, on the outer surfaces of which a pair of windswept surfaces 2121 and 2122 are provided respectively. A support partition wall 2325 may extend longitudinally (in the length direction of the spoiler), and may extend to the upper support wall 2342 between the inner surfaces 2321a and 2322a of the pair of lateral side surface portions 2321 and 2322 (for example, from the neck portion 2123). The support partition wall 2325 may be vertically connected to the upper support wall 2342.

Between the support partition wall 2325 and the inner surfaces 2321a and 2322a of the lateral side surface portions 2321 and 2322, there may be provided through holes P11 and P12, which extend in the longitudinal direction. Accordingly, the structural stability of the deflection part 2320 is improved by virtue of the support partition wall 2325. In particular, the deflection part 2320, which has been deformed due to the application of external force, can be restored to its normal correct position upon release of the external force.

Figure 24:
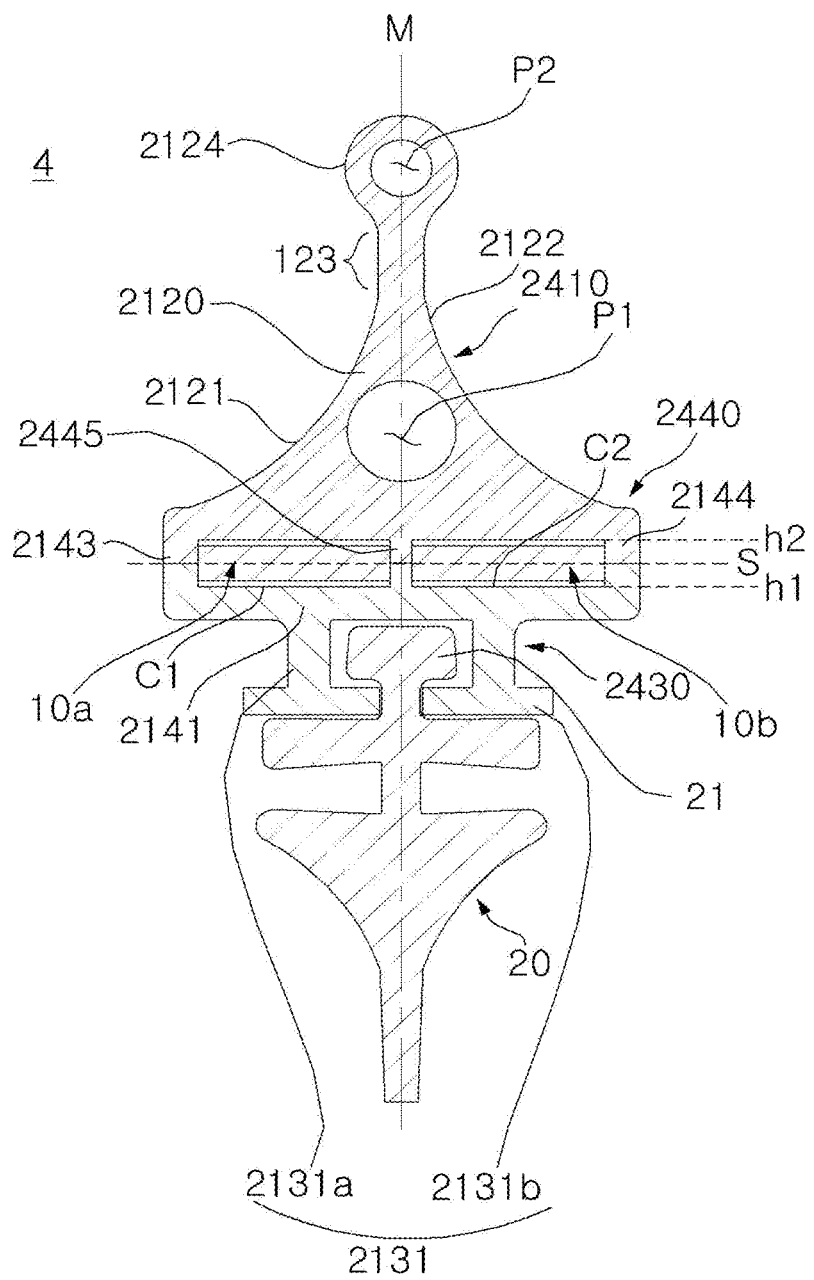

FIG. 24 illustrates a spoiler according to a fourth embodiment in the embodiment of the windshield wiper blade 100 according to the present invention.

Referring to FIG. 24, the spoiler according to the fourth embodiment includes the flexible deflection part 2410 and the hard base part 2430. The embodiment of the windshield wiper blade 100 according to the present invention may include a pair of elastic members 10a and 10b. In this embodiment, the intermediate part 2440 has a first through hole C1 and a second through hole C2, which are divided by means of a separating partition wall 2445, so as to allow the pair of elastic members 10a and 10b to be respectively fitted into the first through hole C1 and the second through hole C2.

The boundary S, at which the deflection part 2410 is bonded to the base part 2430, is defined in a zone between the lower end and the upper end of the separating partition wall 2445 (in a zone between height h1 and h2).

In some embodiments, the elastic members may be constituted by a single integral component having a pair of rails, which are spaced apart from each other by a predetermined distance. The pair of rails may be longitudinally fitted into the first thorough hole C1 and the second through hole C2, respectively.

Figure 25:
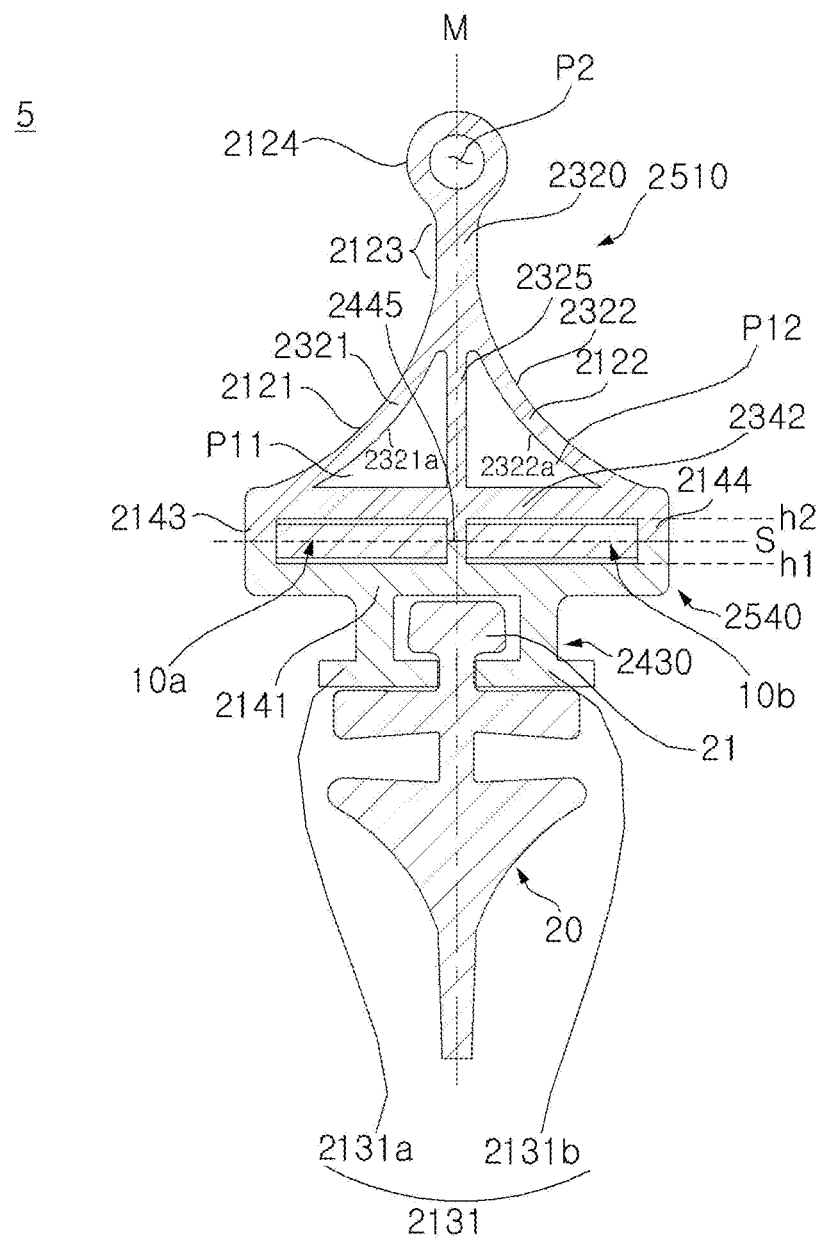

FIG. 25 illustrates a spoiler according to a fifth embodiment in the embodiment of the windshield wiper blade 100 according to the present invention.

Referring to FIG. 25, the spoiler according to the fifth embodiment has a first elastic member through hole C1 and a second elastic member through hole C2, which are defined between the flexible deflection part 2510 and the hard base part 2430. The deflection part 2510 may further include the upper support wall 2342, which defines the upper surfaces of the elastic member through holes C, that is, C1 and C2, and the deflection part 2510 may include a pair of lateral side surface portions 2321 and 2322, on the outer surfaces of which the pair of windswept surfaces 2121 and 2122 are respectively provided. The support partition wall 2325 extends longitudinally (in the length direction of the spoiler), and may extend to the upper support wall 2342 between the inner surfaces 2321a and 2322a of the pair of lateral side surface portions 2321 and 2322 (for example, from the neck portion 2123). The support partition wall 2325 may be vertically connected to the upper support wall 2342.

The intermediate part 2540 has the first elastic member through hole C1 and the second elastic member through hole C2, which are separated from each other by means of the separating partition wall 2445, so as to allow the pair of elastic members 10a and 10b to be respectively fitted into the first and second elastic member through holes C1 and C2.

The boundary S, at which the deflection part 2510 is bonded to the base part 2430, is defined in a zone between the lower end and the upper end of the separating partition wall 2445 (in a zone between height h1 and h2). The separating partition wall 2445 is preferably aligned with the support partition wall 2325.

The elastic members 10a and 10b may be constituted by a single integral component having a pair of rails, which are spaced apart from each other by a predetermined distance. The pair of rails may be longitudinally fitted into the first thorough hole C1 and the second through hole C2, respectively.

Figure 26:
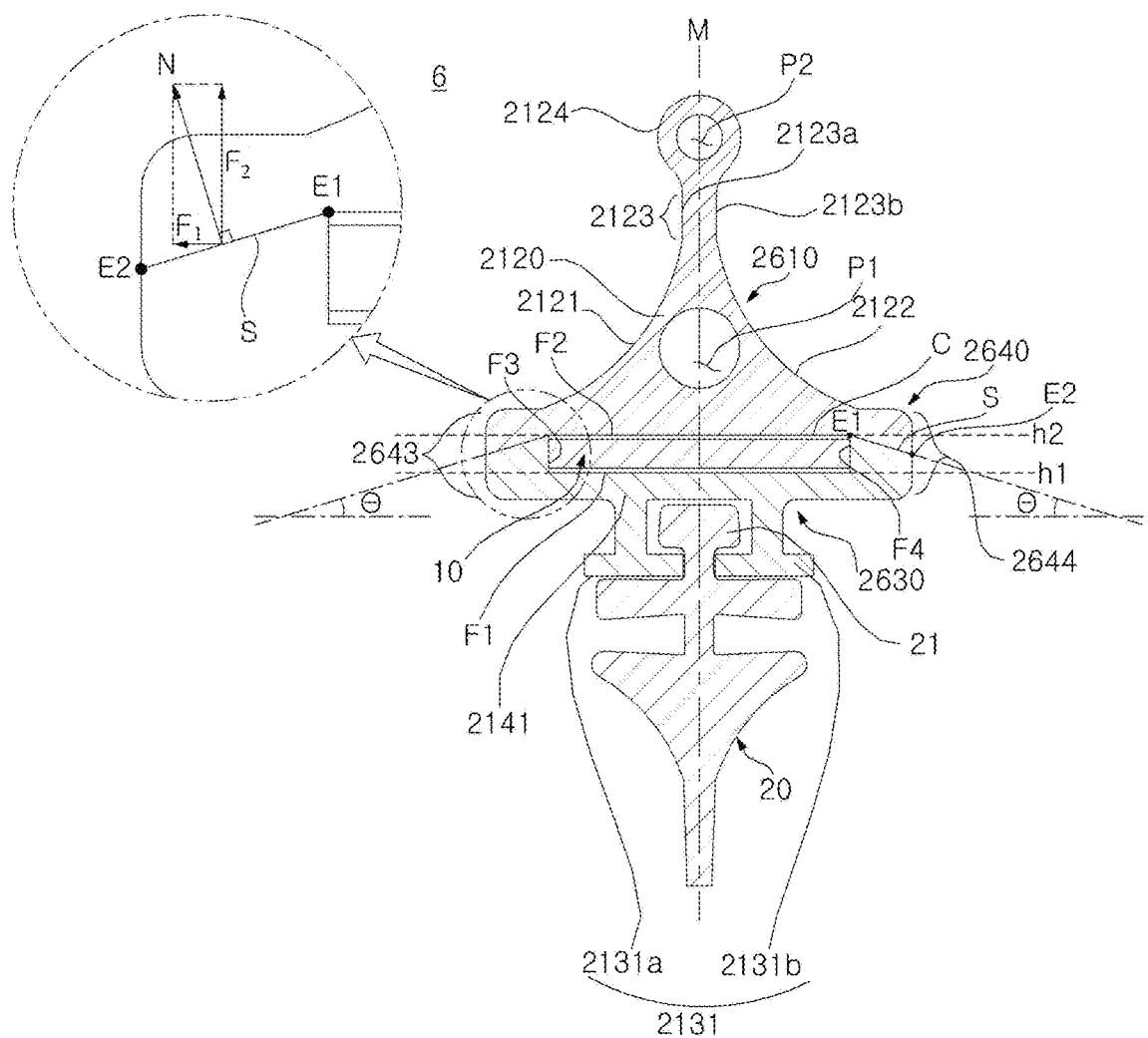

FIG. 26 illustrates a spoiler according to a sixth embodiment in the embodiment of the windshield wiper blade 100 according to the present invention.

Referring to FIG. 26, the spoiler according to the sixth embodiment has a difference in the shape of the boundary S at which the flexible deflection part 2610 is bonded to the hard base part 2630, compared to the spoiler according to the first embodiment, but the other components are the same as those of the first embodiment. Hereinafter, components, which are identical to the components of the previously described embodiments, are denoted by the same reference numerals, and descriptions thereof are replaced with the descriptions in the previous embodiments.

The boundary S between the deflection part 2610 and the base part 2630 is defined in the zone between the height h1 of the lower surface F1 of the elastic member through hole C, which faces the lower surface of the elastic member 10 that faces toward the wiping rubber member 20, and the height h2 of the upper surface F2 of the elastic member through hole C, which faces the upper surface of the elastic member 10 that faces toward the deflection part 2610. The inner end E1 of the boundary S, which is positioned in the inner surface of the lateral side surface F3 or F4 (or the lateral side wall 2643 or 2644) of the elastic member through hole C, is lower than the outer end E2 of the boundary S, which is positioned in the outer surface of the lateral side wall 2643 or 2644. The boundary S is preferably inclined downward to the outer end E2 from the inner end E1. As in the previous embodiments, the lateral side walls 2643 and 2644 define the lateral side surfaces F3 and F4. The boundary S extends across the lateral side walls 2643 and 2644, and the upper part above the boundary S is made of a flexible material, whereas the lower part under the boundary S is made of a hard material.

The inner end E1 of the boundary S may be positioned at any point between the height h1 and the height h2, and preferably at the height h2. Meanwhile, the outer end E2 of the boundary S may be positioned at any point between the height h1 and the height h2, as long as it is positioned lower than the inner end E1.

When the boundary S is inclined downward to the outer end E2 from the inner end E1, the angle θ between the boundary S and the horizontal line is an acute angle. Although the angle θ may have a constant value at any point on the boundary S, the boundary S may be curved in transverse section such that the angle θ varies along the boundary S.

In the structure, in which the boundary S is inclined downward to the outer end E2 from the inner end E1, the drag N acting on the boundary S, which is directed toward the deflection part 2610 from the base part 2630, has a component $F_1$, which is directed in the direction opposite to the direction of wind (for reference, components $F_2$ and $F_1$ are orthogonal to each other). Consequently, when the flexible deflection part 2610 is bent due to wind pressure, it is possible to stably support the lower end of the deflection part 2610, which abuts the boundary S. Accordingly, it is possible to efficiently prevent the deflection part 2610 from being separated from the base part 2630 at the boundary S. Since the deflection part 2610 is made of a flexible material, the lower end of the deflection part 2610 is positively supported, but the upper end of the deflection part 2610, which is provided with the bulging portion 2124 and/or the neck portion 2123, can be flexibly deformed when it is subjected to wind pressure.

The intermediate part 2640, which is a portion defining the lower surface F1, the upper surface F2 and the two lateral side surfaces F3 and F4 of the elastic member through hole C, includes the lower end of the deflection part 2610 and the upper end of the base part 2630. The intermediate part 2640 includes the lower hard support wall 2141 defining the lower surface F1, the lower end of the deflection part 2610 defining the upper surface F2, and the pair of lateral side walls 2643 and 2644 respectively defining the two lateral side surfaces F3 and F4. As is appreciated from the transverse section, the elastic member through hole C, which is defined by the intermediate part 2640, is closed by the lower end of the deflection part 2610, the lower support wall 2141, and the two lateral side walls 2643 and 2644, and the boundary S extends across the two lateral side walls 2643 and 2644.

It will be apparent to those skilled in the art that various modifications and variations can be made in the present invention without departing from the spirit or scope of the invention. Accordingly, it should be understood that the embodiments of the present invention are provided for illustrative purposes rather than for limitative purposes in all aspects. The scope of the present invention is defined by the appended claims rather than by the above detailed description. Thus, it is intended that the present invention cover the modifications and variations of this invention provided they come within the scope of the appended claims and their equivalents.

What is claimed is:

1. A windshield wiper blade comprising:
    an elongated elastic member;
    a wiping rubber member;
    a spoiler extending longitudinally along the elastic member and being supported by the elastic member, the spoiler including a deflection part disposed on the elastic member and a base part disposed under the elastic member so as to hold the wiping rubber member, the deflection part being bendable due to wind pressure applied while a vehicle is being driven; and
    outer plugs coupled to opposite ends of the spoiler, the outer plugs being partially fitted into opposed ends of the deflection part and being partially engaged with the base part,
    wherein each of the opposed ends of the deflection part includes a first holding hole extending longitudinally in the deflection part and a second holding hole extending parallel to the first holding hole in the deflection part,
    wherein each of the outer plugs includes a first projecting pin configured to be fitted into a corresponding first holding hole of the first holding holes and a second projecting pin configured to be fitted into a corresponding second holding hole of the second holding holes, the first projecting pin and the second projecting pin projecting toward the deflection part such that the outer plug seals the corresponding first holding hole of the first holding holes and the corresponding second holding hole of the second holding holes, and
    wherein each of the outer plugs includes a pair of guide pieces, the pair of guide pieces being configured to project toward the deflection part so as to come into surface contact with outer surfaces of the deflection part below the corresponding one of the second holding holes.

2. The windshield wiper blade according to claim 1, wherein the outer plugs are coupled to the opposite ends of the spoiler such that outer surfaces of the outer plugs match outer surfaces of the deflection part.

3. The windshield wiper blade according to claim 1, wherein the deflection part is configured to have a triangular cross-section, and the outer plugs are configured to have a cross-section corresponding to the triangular cross-section of the deflection part.

4. The windshield wiper blade according to claim 3, wherein each of the opposed ends of the deflection part has the first holding hole extending longitudinally in a center of the triangular cross-section of the deflection part and the second holding hole extending longitudinally in an upper apex of the triangular cross-section of the deflection part.

5. The windshield wiper blade according to claim 1, wherein the first projecting pin includes a fitting protrusion on an outer surface thereof such that the first projecting pin is configured to be forcibly fitted into the corresponding one of the first holding holes.

6. The windshield wiper blade according to claim 1, wherein the spoiler has a recess formed at an intermediate portion of the deflection part, the recess being coupled to an adapter assembly configured to couple the windshield wiper to a driving arm mounted on a vehicle.

7. The windshield wiper blade according to claim 6, further comprising inner plugs coupled to opposite ends of the recess prior to the adapter assembly being coupled to the recess.

8. The windshield wiper blade according to claim 7, wherein the inner plugs are configured to be coupled to a center region of the recess by being moved downward from above and then slidably moved to and coupled to the opposite ends of the recess while surrounding lateral side edges of the base part.

9. The windshield wiper blade according to claim 8, wherein each of the inner plugs has a cross-section such that an outer surface thereof matches an outer surface of the deflection part.

10. The windshield wiper blade according to claim 1, wherein the base part is made of a flexible material and the deflection part is made of a hard material.

11. The windshield wiper blade according to claim 1, wherein the spoiler is divided into first and second spoiler segments.

12. A windshield wiper blade comprising:
    an elongated elastic member;

a wiping rubber member;

a spoiler extending longitudinally along the elastic member and being supported by the elastic member, the spoiler including a deflection part disposed on the elastic member and a base part disposed under the elastic member so as to hold the wiping rubber member, the deflection part being bendable due to wind pressure applied while a vehicle is being driven; and outer plugs coupled to opposite ends of the spoiler, the outer plugs being partially fitted into opposed ends of the deflection part and being partially engaged with the base part, wherein each of the opposed ends of the deflection part includes a first holding hole extending longitudinally in the deflection part and a second holding hole extending parallel to the first holding hole in the deflection part, wherein each of the outer plugs includes a first projecting pin configured to be fitted into a corresponding first holding hole of the first holding holes and a second projecting pin configured to be fitted into a corresponding second holding hole of the second holding holes, the first projecting pin and the second projecting pin projecting toward the deflection part such that the outer plug seals the corresponding first holding hole of the first holding holes and the corresponding second holding hole of the second holding holes, and wherein each of the outer plugs has a base part-receiving space formed therein, into which a corresponding one of the opposite ends of the base part of the spoiler are partially fitted, the base part-receiving space includes a first stopper step at a center area thereof, the first stopper step being configured to engage an intermediate portion of the corresponding one of the opposite ends of the spoiler.

13. The windshield wiper blade according to claim 12, wherein the spoiler includes an elastic member through hole extending longitudinally along a boundary between the base part and the deflection part, the elastic member being located in the elastic member through hole, and wherein the base part-receiving space includes a second stopper step, the second stopper step being configured to engage a corresponding end of the elastic member.

14. A windshield wiper blade comprising:
an elongated elastic member;
a wiping rubber member;
a spoiler extending longitudinally along the elastic member and being supported by the elastic member, the spoiler including a deflection part disposed on the elastic member and a base part disposed under the elastic member so as to hold the wiping rubber member, the deflection part being bendable due to wind pressure applied while a vehicle is being driven; and outer plugs coupled to opposite ends of the spoiler, the outer plugs being partially fitted into the deflection part and being partially engaged with the base part, wherein the spoiler has a recess formed at an intermediate portion of the deflection part, the recess being coupled to an adapter assembly configured to couple the windshield wiper to a driving arm mounted on a vehicle, and wherein the adapter assembly comprises:
an adapter configured to be coupled to the driving arm;
an adapter holder connected to the spoiler at the recess to enable the adapter to be coupled to the spoiler; and
an adapter holder bracket mounted to the spoiler, the adaptor holder including:

interference fitting portions located in a center region thereof, the interference fitting portions being configured to be forcibly fitted in the recess; and first and second hook rings having engagement areas to connect the adapter holder to the adaptor holder bracket.

15. The windshield wiper blade according to claim 14, wherein the spoiler includes an elastic member through hole extending longitudinally along a boundary between the base part and the deflection part, the elastic member being located in the elastic member through hole, and wherein the interference fitting portions project downward toward the recess from lateral side edges of the adapter holder bracket to engage lateral side edges of the elastic member.

16. The windshield wiper blade according to claim 15, wherein the base part of the spoiler has mounting cuts formed in regions thereof corresponding to the interference fitting portions so as to avoid interference with the interference fitting portions being coupled to the elastic member.

17. The windshield wiper blade according to claim 14, wherein the adapter holder is coupled to the adapter holder bracket so as to cover the adapter holder bracket, and the adapter holder includes therein first and second hook protrusions, which are hooked to the first and second hook rings, respectively.

18. The windshield wiper blade according to claim 17, wherein the adapter holder further includes a release lever, which is connected to at least one of the first and second hook protrusions and projects outward.

19. The windshield wiper blade according to claim 18, wherein the adapter holder is configured to be engaged with both the first and second hook rings by being pressed downward from above, in order to be coupled to the adapter holder bracket, and wherein the adapter holder is configured to be removed by being rotated after one of the hook couplings between the first and second hook rings and the first and second hook protrusions is released by movement of the release lever, in order to be removed from the adapter holder bracket.

20. A windshield wiper blade comprising:
an elongated elastic member;
a wiping rubber member;
a spoiler extending longitudinally along the elastic member and being supported by the elastic member, the spoiler including a deflection part disposed on the elastic member and a base part disposed under the elastic member so as to hold the wiping rubber member, the deflection part being bendable due to wind pressure applied while a vehicle is being driven, the spoiler having a recess formed at an intermediate portion of the deflection part, the recess being coupled to an adapter assembly configured to couple the windshield wiper to a driving arm mounted on a vehicle;

outer plugs coupled to opposite ends of the spoiler, the outer plugs being partially fitted into opposed ends of the deflection part and being partially engaged with the base part; and inner plugs coupled to opposite ends of the recess prior to the adapter assembly being coupled to the recess, wherein each of the opposed ends of the deflection part includes a first holding hole extending longitudinally in the deflection part and a second holding hole extending parallel to the first holding hole in the deflection part, wherein each of the outer plugs includes a first projecting pin configured to be fitted into a corresponding first holding hole of the first holding holes and a second projecting pin configured to be fitted into a corresponding second holding hole of the second holding holes, the first projecting pin and the second projecting pin projecting toward the deflection part such that the outer plug seals the corresponding first holding hole of the first holding holes and the corresponding second holding hole of the second holding holes wherein the inner plugs are configured to be coupled to a center region of the recess by being moved downward from above and then slidably moved to and coupled to the opposite ends of the recess while surrounding lateral side edges of the base part, wherein the deflection part has a triangular cross-section, first holding holes extending longitudinally in a center of the triangular cross-section of the deflection part away from the opposite ends of the recess, and second fitting holes extending longitudinally in an upper apex of the triangular cross-section of the deflection part away from the opposite ends of the recess, and wherein each of the inner plugs comprises a first projecting pin fitted into a corresponding one of the first holding holes and a second projecting pin fitted into a corresponding one of the second holding holes.

* * * * *